US012809732B2

(12) United States Patent
Ohira et al.

(10) Patent No.: US 12,809,732 B2
(45) Date of Patent: Nov. 24, 2026

(54) INFORMATION PROCESSING SYSTEM AND INFORMATION PROCESSING METHOD

(71) Applicant: Hitachi, Ltd., Tokyo (JP)

(72) Inventors: Yoshinori Ohira, Tokyo (JP); Hideo Saito, Tokyo (JP); Takaki Nakamura, Tokyo (JP); Akira Yamamoto, Tokyo (JP); Takahiro Yamamoto, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 40 days.

(21) Appl. No.: 18/119,414

(22) Filed: Mar. 9, 2023

(65) Prior Publication Data

US 2024/0220378 A1 Jul. 4, 2024

(30) Foreign Application Priority Data

Dec. 28, 2022 (JP) ................................ 2022-212311

(51) Int. Cl.
*G06F 11/20* (2006.01)
*G06F 11/16* (2006.01)

(52) U.S. Cl.
CPC ...... *G06F 11/2092* (2013.01); *G06F 11/1662* (2013.01); *G06F 11/203* (2013.01)

(58) Field of Classification Search
CPC ............. G06F 13/1668; G06F 11/2092; G06F 11/1662; G06F 11/203; G06F 11/2087;
(Continued)

(56) References Cited

U.S. PATENT DOCUMENTS

| | | | | |
|---|---|---|---|---|
| 11,966,304 B1 * | 4/2024 | Havemose | .......... | G06F 11/1448 |
| 2002/0035667 A1 * | 3/2002 | Bruning, III | ........ | G06F 11/2058 714/E11.034 |

(Continued)

FOREIGN PATENT DOCUMENTS

| | | | |
|---|---|---|---|
| CN | 107402850 A * | 11/2017 | .......... G06F 11/1448 |
| JP | 2019071100 A | 5/2019 | |

(Continued)

OTHER PUBLICATIONS

Japanese Office Action received in corresponding Japanese Application No. 2022-212311 dated Aug. 6, 2024.

*Primary Examiner* — Arpan P. Savla
(74) *Attorney, Agent, or Firm* — MATTINGLY & MALUR, PC

(57) ABSTRACT

Proposed are a highly available information processing system and information processing method capable of withstanding a failure in units of sites. A redundancy group including a plurality of the storage controllers installed in different sites is formed, and the redundancy group includes an active state storage controller which processes data, and a standby state storage controller which takes over processing of the data if a failure occurs in the active state storage controller, and the active state storage controller executes processing of storing the data from a host application installed in the same site in the storage device installed in that site, and storing redundant data for restoring data stored in a storage device of a same site in the storage device installed in another site where a standby state storage controller of a same redundancy group is installed.

7 Claims, 21 Drawing Sheets

(58) Field of Classification Search
CPC ............. G06F 11/2089; G06F 11/2069; G06F 11/1446; G06F 11/2094
See application file for complete search history.

(56) References Cited

U.S. PATENT DOCUMENTS

| | | | | |
|---|---|---|---|---|
| 2012/0054409 | A1* | 3/2012 | Block | G06F 11/203 718/1 |
| 2012/0290714 | A1* | 11/2012 | Cohen | G06F 11/3055 709/224 |
| 2015/0006693 | A1* | 1/2015 | Elias | H04L 41/0893 709/223 |
| 2016/0371145 | A1 | 12/2016 | Akutsu et al. | |
| 2017/0220481 | A1* | 8/2017 | McKean | G06F 3/0611 |
| 2017/0235950 | A1* | 8/2017 | Gopalapura Venkatesh | G06F 11/2025 726/24 |
| 2019/0138398 | A1* | 5/2019 | Dethe | G06F 11/1464 |
| 2019/0188100 | A1* | 6/2019 | Patel | G06F 3/067 |
| 2019/0245923 | A1* | 8/2019 | Williams | H04L 49/356 |
| 2020/0042416 | A1 | 2/2020 | Satoyama et al. | |
| 2020/0210291 | A1 | 7/2020 | Yamamoto et al. | |
| 2024/0036976 | A1* | 2/2024 | Shah | G06F 11/1076 |

FOREIGN PATENT DOCUMENTS

| | | | |
|---|---|---|---|
| JP | 2020-021277 | A | 2/2020 |
| JP | 2020107082 | A | 7/2020 |
| JP | 2021-036450 | A | 3/2021 |

* cited by examiner

FIG. 4

STORAGE CONFIGURATION MANAGEMENT TABLE 35

| DC ID | SERVER ID | NETWORK DRIVE ID |
|---|---|---|
| 000 | 000 | 000,001 |
| | 001 | 002,003 |
| 100 | 100 | 100,101 |
| | 101 | 102,103 |
| 200 | 200 | 200,201 |
| | 201 | 202,203 |
| 35A | 35B | 35C |

FIG. 8

STORAGE CONTROLLER MANAGEMENT TABLE 40

| REDUNDANCY GROUP ID | ACTIVE SERVER ID | STANDBY SERVER ID |
|---|---|---|
| 1 | 100 | 200,300 |
| 2 | 200 | 300,101 |
| 3 | 300 | 101,201 |
| ... | ... | ... |
| 40A | 40B | 40C |

FIG. 9

CHUNK GROUP MANAGEMENT TABLE 41

| CHUNK GROUP ID | DATA PROTECTION POLICY | PHYSICAL CHUNK ID |
|---|---|---|
| 0 | MIRRORING | 100,200,300 |
| 1 | 2D1P | 101,201,301 |
| ... | ... | ... |
| 41A | 41B | 41C |

FIG. 11

HOST VOLUME MANAGEMENT TABLE 52

| HVOL ID | OWNER DATA CENTER ID | OWNER SERVER ID | SIZE |
|---|---|---|---|
| 1 | 1 | 100 | 100GB |
| 2 | 2 | 200 | 200GB |
| ... | ... | ... | ... |
| 52A | 52B | 52C | 52D |

HOST VOLUME CREATION PROCESSING

VOLUME MIGRATION PROCESSING

HOST VOLUME CREATION PROCESSING

INFORMATION PROCESSING SYSTEM AND INFORMATION PROCESSING METHOD

CROSS-REFERENCE TO RELATED APPLICATION

The present application claims priority from Japanese application JP2022-212311, filed on Dec. 28, 2022, the contents of which is hereby incorporated by reference into this application.

TECHNICAL FIELD

The present invention relates to an information processing system and an information processing method and, for example, can be suitably applied to a distributed storage system.

BACKGROUND ART

In recent years, pursuant to the growing use of clouds, needs of a storage for managing data on a cloud are increasing. In particular, a cloud is configured from a plurality of sites (these are hereinafter referred to as "availability zones" as appropriate), and a highly available storage system capable of withstanding a failure in units of availability zones is demanded.

Note that, as a technology for realizing the high availability of a storage system, for example, PTL 1 discloses a technology of realizing the redundancy of data hierarchically within a data center and between data centers. Moreover, PTL 2 discloses a technology of storing a symbol (parity) for data restoration in one or more storage nodes which differ from the storage destination of user data.

CITATION LIST

Patent Literature

[PTL 1] Japanese Unexamined Patent Application Publication No. 2019-071100

[PTL 2] Japanese Unexamined Patent Application Publication No. 2020-107082

SUMMARY OF THE INVENTION

Problems to be Solved by the Invention

Meanwhile, normally, the respective availability zones of a cloud are geographically separated, and, when a distributed storage system is configured across the availability zones, communication will arise between the availability zones, and there is a problem in that the I/O performance will be affected due to a communication delay. Moreover, since a charge will arise according to the communication volume between the availability zones, there is a problem in that costs will increase when the communication volume is high.

The present invention was devised in view of the foregoing points, and a main object of this invention is to propose a highly available information processing system and information processing method capable of withstanding a failure in units of sites (availability zones), and another object of this invention is to propose an information processing system and information processing method capable of suppressing the deterioration in the I/O performance caused by a communication delay associated with the communication between the sites and the generation of costs caused by the communication between the sites.

Means to Solve the Problems

In order to achieve the foregoing object, the present invention provides an information processing system including a plurality of storage servers installed in each of a plurality of sites connected to a network, comprising: a storage device which is installed in each of the sites and stores data; and a storage controller which is mounted on the storage server, provides a logical volume to a host application, and processes data to be read from and written into the storage device via the logical volume, wherein: a redundancy group including a plurality of the storage controllers installed in different sites is formed, and the redundancy group includes an active state storage controller which processes data, and a standby state storage controller which takes over processing of the data if a failure occurs in the active state storage controller; and the active state storage controller executes processing of: storing the data from a host application installed in the same site in the storage device installed in that site; and storing redundant data for restoring data stored in a storage device of a same site in the storage device installed in another site where a standby state storage controller of a same redundancy group is installed.

Moreover, the present invention additionally provides an information processing method to be executed in an information processing system including a plurality of storage servers installed in each of a plurality of sites connected to a network, wherein the information processing system includes: a storage device which is installed in each of the sites and stores data; and a storage controller which is mounted on the storage server, provides a logical volume to a host application, and processes data to be read from and written into the storage device via the logical volume, wherein: a redundancy group including a plurality of the storage controllers installed in different sites is formed, and the redundancy group includes an active state storage controller which processes data, and a standby state storage controller which takes over processing of the data if a failure occurs in the active state storage controller; and the information processing method comprises a step of the active state storage controller executing processing of: storing the data from a host application installed in the same site in the storage device installed in that site; and storing redundant data for restoring data stored in a storage device of a same site in the storage device installed in another site where a standby state storage controller of a same redundancy group is installed.

According to the information processing system and information processing method of the present invention, it is possible to store redundant data in another site while securing data locality. Thus, even if a failure in units of sites occurs in a site where an active state storage controller is installed, the processing that was being performed by the active state storage controller until then can be taken over by a standby state storage controller configuring the same redundancy group.

Advantageous Effects of the Invention

According to the present invention, it is possible to realize a highly available information processing system and information processing method capable of withstanding a failure in units of sites.

BRIEF DESCRIPTION OF DRAWINGS

FIG. 4 is a diagram showing the storage configuration management table.

FIG. 8 is a diagram showing the storage controller management table.

FIG. 9 is a diagram showing the chunk group management table.

FIG. 11 is a diagram showing the host volume management table.

DESCRIPTION OF EMBODIMENTS

Figure 1:
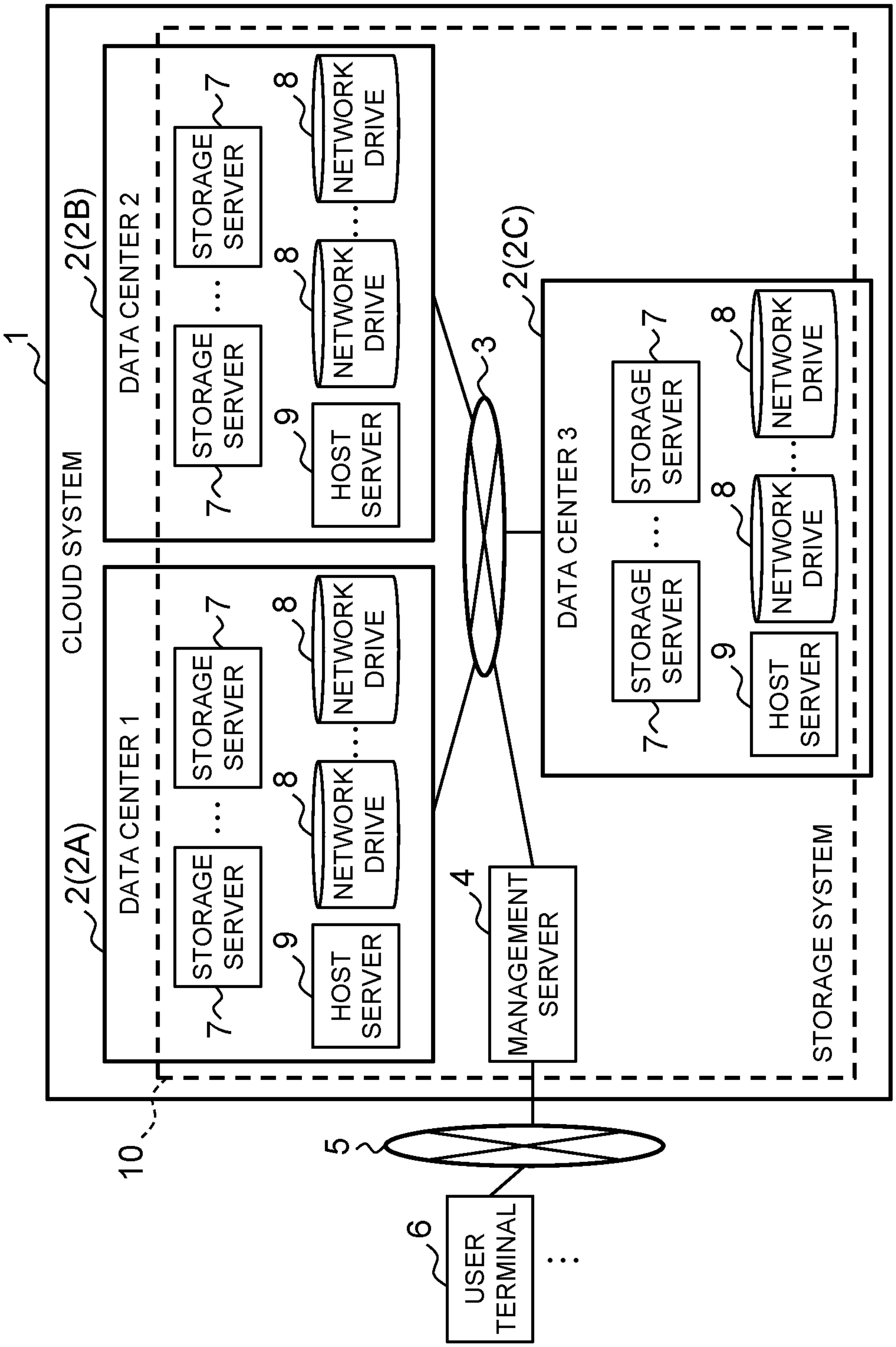
FIG. 1 is a block diagram showing the overall configuration of the storage system according to the first embodiment.

An embodiment of the present invention is now explained in detail with reference to the appended drawings. Note that the following descriptions and appended drawings are merely examples for explaining the present invention, and are not intended to limit the technical scope of the present invention. Moreover, the same reference number is assigned to the common configuration in the respective drawings.

In the following explanation, while various types of information may be explained using expressions such as “table”, “chart”, “list”, and “queue”, the various types of information may also be expressed with other data structures. “XX table”, “XX list” and the like may sometimes be referred to as “XX information” to show that it does not depend on the data structure. While expressions such as “identification information”, “identifier”, “name”, “ID”, and “number” are used in explaining the contents of each type of information, these are mutually replaceable.

Moreover, in the following explanation, when explaining similar elements without distinction, a reference character or a common number in a reference character will be used, and when explaining similar elements distinctively, a reference character of such element may be used or an ID assigned to such element in substitute for a reference character may be used.

Moreover, in the following explanation, while there are cases where processing, which is performed by executing programs, is explained, because a program performs predetermined processing by suitably using a storage resource (for example, memory) and/or an interface device (for example, communication port) as a result of being executed at least by one or more processors (for example, CPUs), the subject of the processing may also be the processor. Similarly, the subject of the processing to be performed by executing programs may be a controller, a device, a system, a computer, a node, a storage system, a storage device, a server, a management computer, a client or a host equipped with a processor. The subject (for example, processor) of the processing to be performed by executing programs may include a hardware circuit which performs a part or all of the processing. For example, the subject of the processing to be performed by executing programs may include a hardware circuit which executes encryption and decryption, or compression and expansion. The processor operates as function parts which realize predetermined functions by being operated according to programs. A device and a system including a processor are a device and a system including these function parts.

The programs may also be implemented in a device, such a computer, from a program source. The program source may be, for example, a program distribution server or a computer-readable storage media. When the program source is a program distribution server, the program distribution server includes a processor (for example, CPU) and a storage resource, and the storage resource may additionally store a distribution program and programs to be distributed. Furthermore, the processor of the program distribution server may distribute the programs to be distributed to another computer as a result of the processing of the program distribution server executing the distribution program. Moreover, in the following explanation, two or more programs may be realized as one program, and one

(1) Configuration of the Storage System According to this Embodiment

(1-1) Configuration of the Storage System According to this Embodiment

In FIG. 1, reference numeral 1 shows the overall cloud system according to this embodiment. The cloud system 1 is configured by comprising first, second and third data centers 2A, 2B, 2C which are each installed in different availability zones. Note that, in the following explanation, when there is no need to particularly differentiate the first to third data centers 2A to C, they will be collectively referred to as the data center(s) 2.

These data centers 2 are mutually connected via a dedicated network 3. Moreover, a management server 4 is connected to the dedicated network 3, and a user terminal 6 is connected to the management server 4 via a network 5 such as the internet. Moreover, one or more storage servers 7 and one or more network drives 8 each configuring a distributed storage system are installed in each of the data centers 2A to C. The configuration of the storage server 7 will be described later.

The network drive 8 is configured from a large-capacity, non-volatile storage device such as an SAS (Serial Attached SCSI (Small Computer System Interface)), SSD (Solid State Drive), NVMe (Non Volatile Memory express) or SATA (Serial ATA (Advanced Technology Attachment)). Each network drive 8 is logically connected to one of the storage servers 7 each located within the same data center 2, and provides a physical storage area to the storage server 7 of the connection destination.

Figure 3:
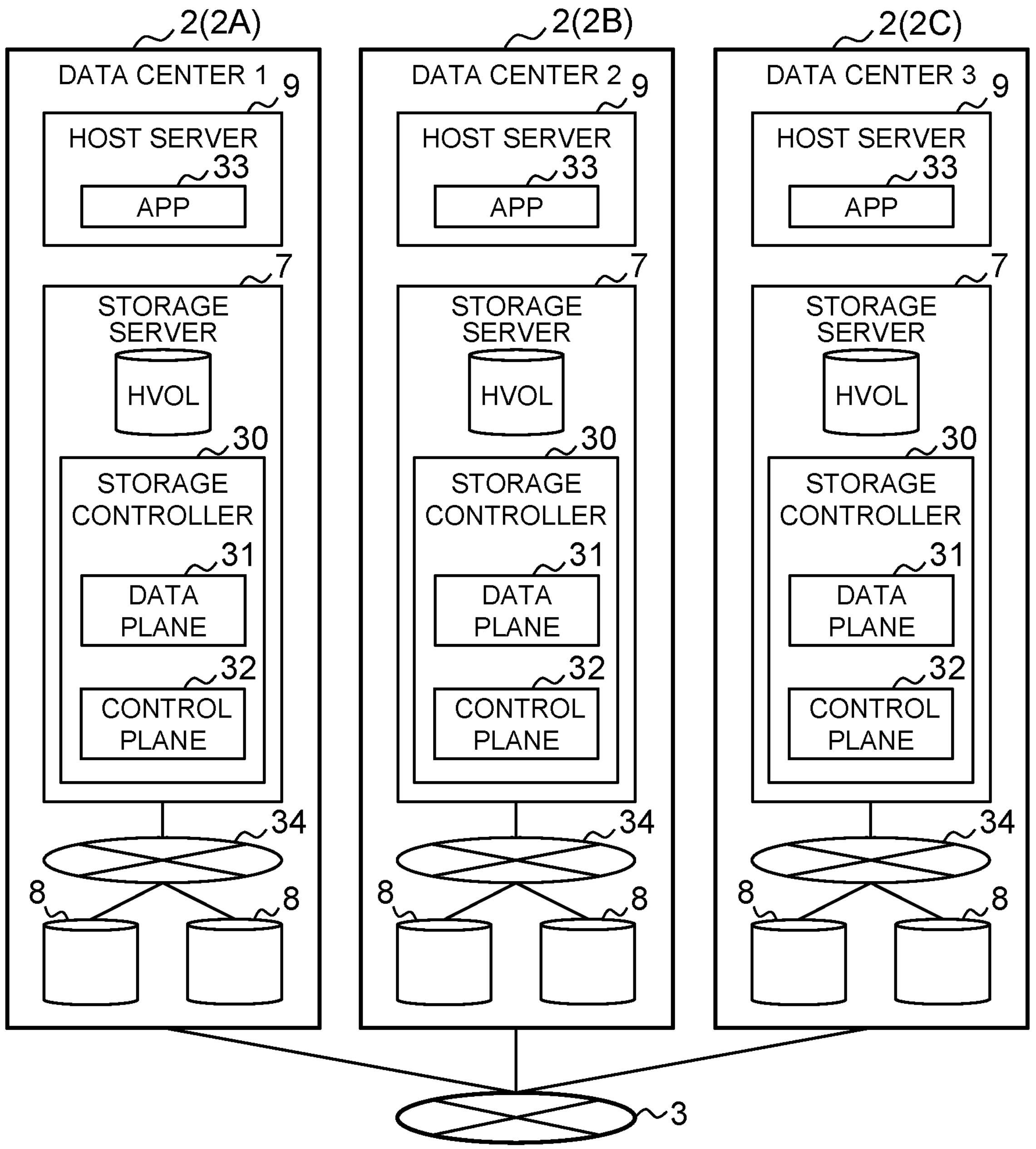
FIG. 3 is a block diagram showing the logical configuration of the storage server.

While the network drive 8 may be housed in each storage server 7 or housed separately from the storage server 7, in the following explanation, as shown in FIG. 3, let it be assumed that the network drive 8 is provided separately from the storage server 7. Each storage server 7 is physically connected to each network drive 8 in the same data center 2 vis an intra-data center network 34 (FIG. 3) such as a LAN (Local Area Network).

Moreover, a host server 9 installed with an application 33 (FIG. 3), such as a database application, is disposed in each data center 2. The server 9 is configured from a physical computer device, or a virtual machine such as a virtual computer device.

The management server 4 is configured from a general-purpose computer device equipped with a CPU (Central Processing Unit), a memory and a communication device, and is used by an administrator of a storage system 10 configured from the respective storage servers 7 installed in each data center 2, and a management server 4, for managing the storage system 10.

The management server 4, for example, performs various settings to the storage servers 7 and changes such settings and collects necessary information from the storage servers 7 of each data center 2 by sending the administrator's operational input or a command according to a request from a user of the storage system 10 via the user terminal 6 to the storage servers 7 of each data center 2.

The user terminal 6 is a communication terminal device used by the user of the storage system 10, and is configured from a general-purpose computer device. The user terminal 6 sends a request according to the user's operation to the management server 4 via the network 5, and displays information sent from the management server 4.

Figure 2:
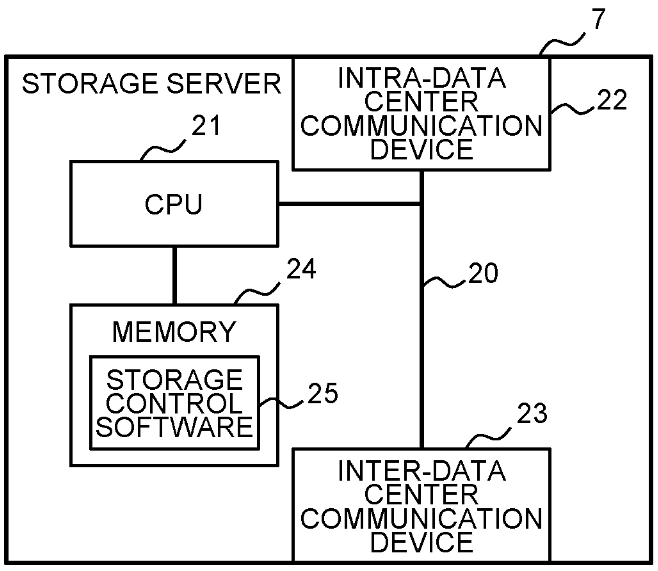
FIG. 2 is a block diagram showing the hardware configuration of the storage server.

FIG. 2 shows the physical configuration of the storage server 7. The storage server 7 is a general-purpose server device having a function of reading/writing user data from and to a storage area provided by the network drive 8 according to an I/O request from the application 33 (FIG. 3) installed in the host server 9.

As shown in FIG. 2, the storage server 7 is configured by comprising one or more of a CPU 21, an intra-data center communication device 22 and an inter-data center communication device 23 mutually connected via an internal network 20, and a memory 24 connected to the CPU 21.

The CPU 21 is a processor that governs the operational control of the storage servers 7. Moreover, the intra-data center communication device 22 is an interface for a storage server 7 to communicate with another storage server 7 within the same data center 2 or access the network drive 8 in the same data center 2, and, for example, is configured from a LAN card or an NIC (Network Interface Card).

The inter-data center communication device 23 is an interface for a storage server 7 to communicate with a storage server 7 in another data center 2 via the dedicated network 3 (FIG. 1), and, for example, is configured from an NIC or a fiber channel card.

The memory 24 is configured, for example, from a volatile semiconductor memory such as an SRAM (Static RAM (Random Access Memory)) or a DRAM (Dynamic RAM), and is used for temporarily storing various programs and necessary data. The various types of processing as the overall storage server 7 are executed as described later by the CPU 21 executing the programs stored in the memory 24. The storage control software 25 described later is also stored and retained in the memory 24.

FIG. 3 shows the logical configuration of the storage server 7. As shown in FIG. 3, each storage server 7 installed in each data center 2 comprises one or more storage controllers 30 each configuring an SDS (Software Defined Storage). The storage controller 30 is a functional part that is realized by the CPU 21 (FIG. 2) executing the storage control software 25 (FIG. 2) stored in the memory 24 (FIG. 2). The storage controller 30 comprises a data plane 31 and a control plane 32.

The data plane 31 is a functional part having a function of reading/writing user data from and to the network drive 8 via the intra-data center network 34 according to a write request or a read request (this is hereinafter collectively referred to as an "I/O (Input/Output) request" as appropriate) from the application 33 installed in the host server 9.

In effect, in the storage system 10, a virtual logical volume (this is hereinafter referred to as the "host volume") HVOL, in which a physical storage area provided by the network drive 8 was virtualized in the storage server 7, is provided to the application 33 installed in the host server 9 as a storage area for reading/writing user data. Moreover, the host volume HVOL is associated with one of the storage controllers 30 within the storage server 7 in which the host volume HVOL was created.

When the data plane 31 receives a write request designating a write destination in the host volume HVOL associated with the storage controller 30 where it is installed (this is hereinafter referred to as the "own storage controller 30") and the user data to be written from the application 33 of the host server 9, the data plane 31 dynamically assigns a physical storage area, which is provided by the network drive 8 logically connected to the storage server 7 equipped with the own storage controller 30, to a virtual storage area designated as the write destination within the host volume HVOL, and stores the user data in that physical area.

Moreover, when the data plane 31 receives a read request designating a read destination in the host volume HVOL from the application 33 of the host server 9, the data plane 31 reads user data from the corresponding physical area of the corresponding network drive 8 assigned to the read destination in the host volume HVOL, and sends the read user data to the application 33.

The control plane 32 is a functional part having a function of managing the configuration of the storage system 10. For example, the control plane 32 manages, using the storage configuration management table 35 shown in FIG. 4, information such as what kind of storage servers 7 are installed in each data center 2, and which network drive 8 is logically connected to these storage servers 7.

As shown in FIG. 4, the storage configuration management table 35 is configured by comprising a data center ID column 35A, a server ID column 35B and a network drive ID column 35C.

The data center ID column 35A stores an identifier (data center ID) that was assigned to each data center 2 and which is unique to that data center 2. Moreover, the server ID column 35B is classified by being associated with each of the storage servers 7 installed in the corresponding data center 2, and stores an identifier (server ID) that was assigned to the storage server 7 each corresponding to each classified column (these are hereinafter each referred to as the "server column") and which is unique to that storage server 7.

Furthermore, the network drive ID column 35C is classified by being associated with each of the server ID columns 35B, and stores an identifier (network drive ID) of all network drives 8 logically connected with the storage server 7 (that can be used by that storage server 7) in which the server ID is stored in the corresponding server ID column 35B.

Accordingly, the example of FIG. 4 shows that, for example, a data center 2 having a data center ID of "000" is installed with a storage server 7 having a server ID of "000" and a storage server 7 having a server ID of "001", and a network drive 8 having a network ID of "000" and a network drive 8 having a network ID of "001" are each logically connected to the storage server 7 of "000".

Figure 5:
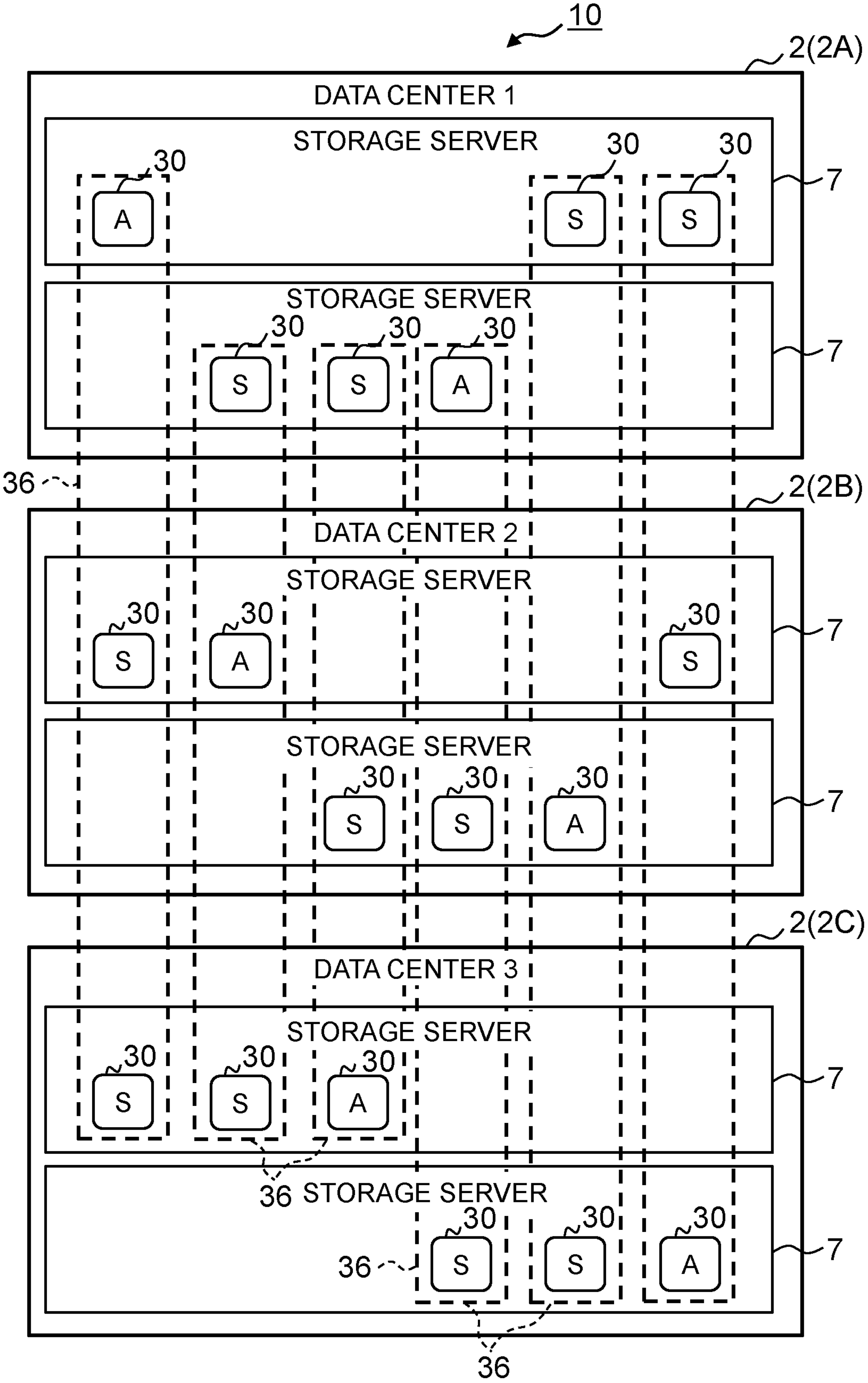
FIG. 5 is a conceptual diagram explaining the redundancy group.

FIG. 5 shows a configuration example of the redundancy configuration of the storage controller 30 in the storage system 10. In the storage system 10, each storage controller 30 installed in the storage server 7 is managed as one group (this is hereinafter referred to as the "redundancy group") 36 for redundancy together with one or more other storage controllers 30 installed in one of the storage servers 7 which are each installed in mutually different data centers 2.

Note that FIG. 5 shows an example where one redundancy group 36 is configured from three storage controllers 30 installed in mutually different data centers 2. While the following explanation will be provided on the assumption that one redundancy group 36 is also configured from these three storage controllers 30, the redundancy group 36 may also be configured from two or four storage controllers 30.

In the redundancy group 36, a priority is set to each storage controller 30. The storage controller 30 having the highest priority is set to an operating mode in which its data plane 31 (FIG. 3) can receive an I/O request from the host server 9 (status of a currently used system; this is hereinafter referred to as the "active mode"), and the remaining storage controllers 30 are set to an operating mode in which its data plane 31 cannot receive an I/O request from the host server 9 (status of a standby system; this is hereinafter referred to as the "standby mode"). In FIG. 5, the storage controller 30 set to the active mode is indicated as "A", and the storage controller 30 set to the standby mode is indicated as "S".

Furthermore, in the redundancy group 36, if a failure occurs in the storage controller 30 set to the active mode or in the storage server 7 installed with that storage controller 30, the operating mode of the storage controller 30 having the highest priority among the remaining storage controllers 30 which were previously set to the standby mode is switched to the active mode. Consequently, even if the storage controller 30 that was set to the active mode is no longer operable, the I/O processing that was being executed by that storage controller 30 until then can be taken over by another storage controller 30 that was previously set to the standby mode (fail-over function).

In order to realize this kind of fail-over function, the control plane 32 of the storage controller 30 belonging to the same redundancy group 36 constantly retains metadata of the same content. Metadata is information required for the storage controller 30 to execute processing related to various functions such as a capacity virtualization function, a hierarchical storage control function of migrating data with a greater access frequency to a storage area with a faster response speed, a deduplication function of deleting redundant data among the stored data, a compression function of compressing and storing data, a snapshot function of retaining the status of data at a certain point in time, and a remote copy function of copying data to a remote location synchronously or asynchronously as disaster control measures. Moreover, metadata additionally includes the storage configuration management table 35 described above with reference to FIG. 4, the storage controller management table 40 described later with reference to FIG. 8, the chunk group management table 41 described later with reference to FIG. 9, and the host volume management table 52 described above with reference to FIG. 11.

When metadata of the active mode storage controller 30 configuring the redundancy group 36 is updated due to a configuration change or any other reason, the control plane 32 (FIG. 3) of that storage controller 30 transfers the difference of that metadata before and after the update as difference data to another storage controller 30 configuring that redundancy group 36, and the metadata retained by the other storage controller 30 is updated by the control plane 32 of that storage controller 30 based on the difference data. The metadata of each storage controller 30 configuring the redundancy group 36 is thereby maintained in a synchronized state at all times.

As a result of each storage controller 30 configuring the redundancy group 36 constantly retaining metadata of the same content as described above, even if a failure occurs in the storage controller 30 set to the active mode or in the storage server 7 on which that storage controller 30 is running, the processing that was previously being executed by that storage controller 30 until then can be immediately taken over by another storage controller 30 configuring the same redundancy group 36 as the failed storage controller 30.

Figure 6:
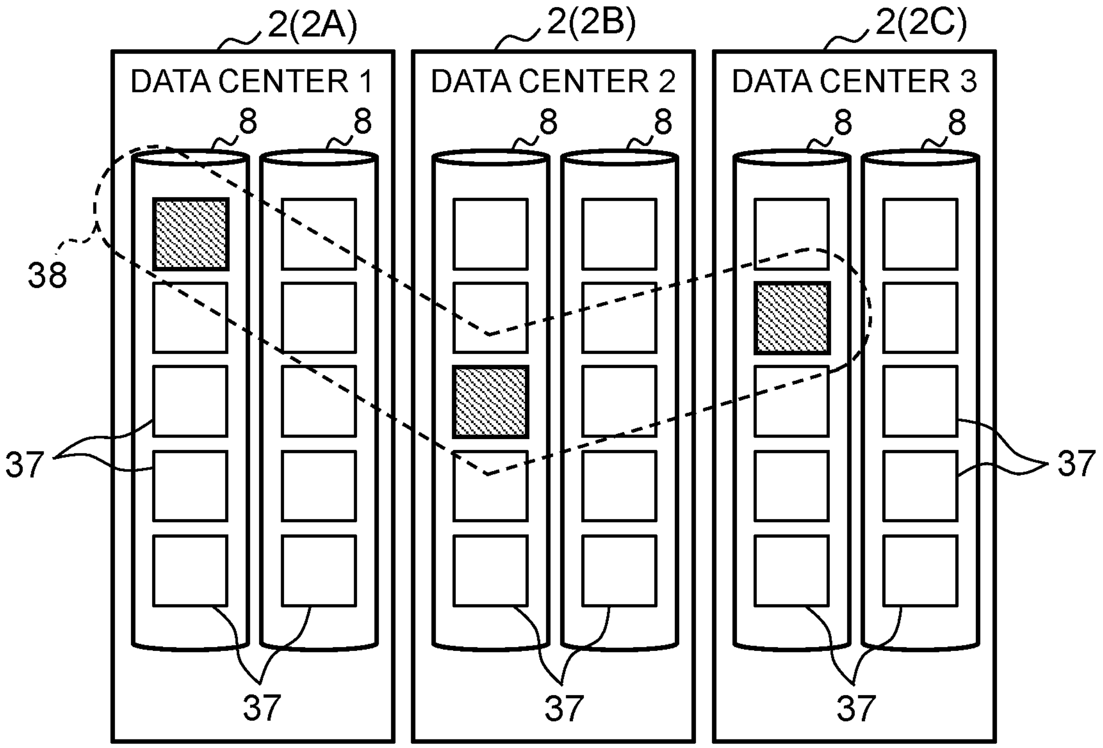
FIG. 6 is a conceptual diagram explaining the chunk group.

Meanwhile, FIG. 6 shows the management method of the storage area in the storage system 10. In the storage system 10, the storage area provided by each network drive 8 is managed by being divided into a physical area of a fixed size (for example, several 100 GB). In the following explanation, this physical area is referred to as a physical chunk 37.

The physical chunk 37 is managed as one group (this is hereinafter referred to as the "chunk group") 38 for making the user data redundant together with one or more other physical chunks 37 defined in one of the network drives 8 each installed in mutually different data centers 2.

FIG. 6 shows an example where one chunk group 38 is configured from three physical chunks 37 (respective physical chunks 37 shown with diagonal lines in FIG. 6) each existing in mutually different data centers 2, and the following explanation will also be provided on the assumption that one chunk group 38 is configured from three physical chunks 37 each existing in mutually different data centers 2.

Each physical chunk 37 configuring the same chunk group 38 is, as a general rule, assigned to the storage controller 30 in the same data center 2 as that physical chunk 37 configuring the same redundancy group 36.

Accordingly, for example, a physical chunk 37 in a first data center 2A configuring a certain chunk group 38 is assigned to a storage controller 30 in the first data center 2A configuring a certain redundancy group 36. Moreover, a physical chunk 37 in a second data center 2B configuring that chunk group 38 is assigned to a storage controller 30 in the second data center 2B configuring that redundancy group 36, and a physical chunk 37 in a third data center 2C configuring that chunk group 38 is assigned to a storage controller 30 in the third data center 2C configuring that redundancy group 36.

The writing of user data in a chunk group 38 is performed according to a pre-set data protection policy. As the data protection policy to be applied to the storage system 10 of this embodiment, there are mirroring and EC (Erasure Coding). "Mirroring" is the method of storing user data, which is exactly the same as the user data stored in a certain physical chunk 37, in another physical chunk 37 configuring the same chunk group 38 as that physical chunk 37. Moreover, as "EC", there are a first method that goes not guarantee data locality and a second method that guarantees data locality, and this embodiment adopts the second method of guaranteeing data locality in the data center 2.

In other words, in the storage system 10 of this embodiment, even when either mirroring or EC is designated as the data protection policy in the chunk group 38, the user data used by the application 33 (FIG. 3) installed in the host server 9 and metadata related to that user data are retained in the same data center 2 as that application 33.

An example of the second method of EC applied to the storage system 10 is now specifically explained with reference to FIG. 7. Note that, in the case of the second method of EC of this example, there is no need to assign each physical chunk 37 configuring the same chunk group 38 to each storage controller 30 configuring a redundancy group 36.

Figure 7:
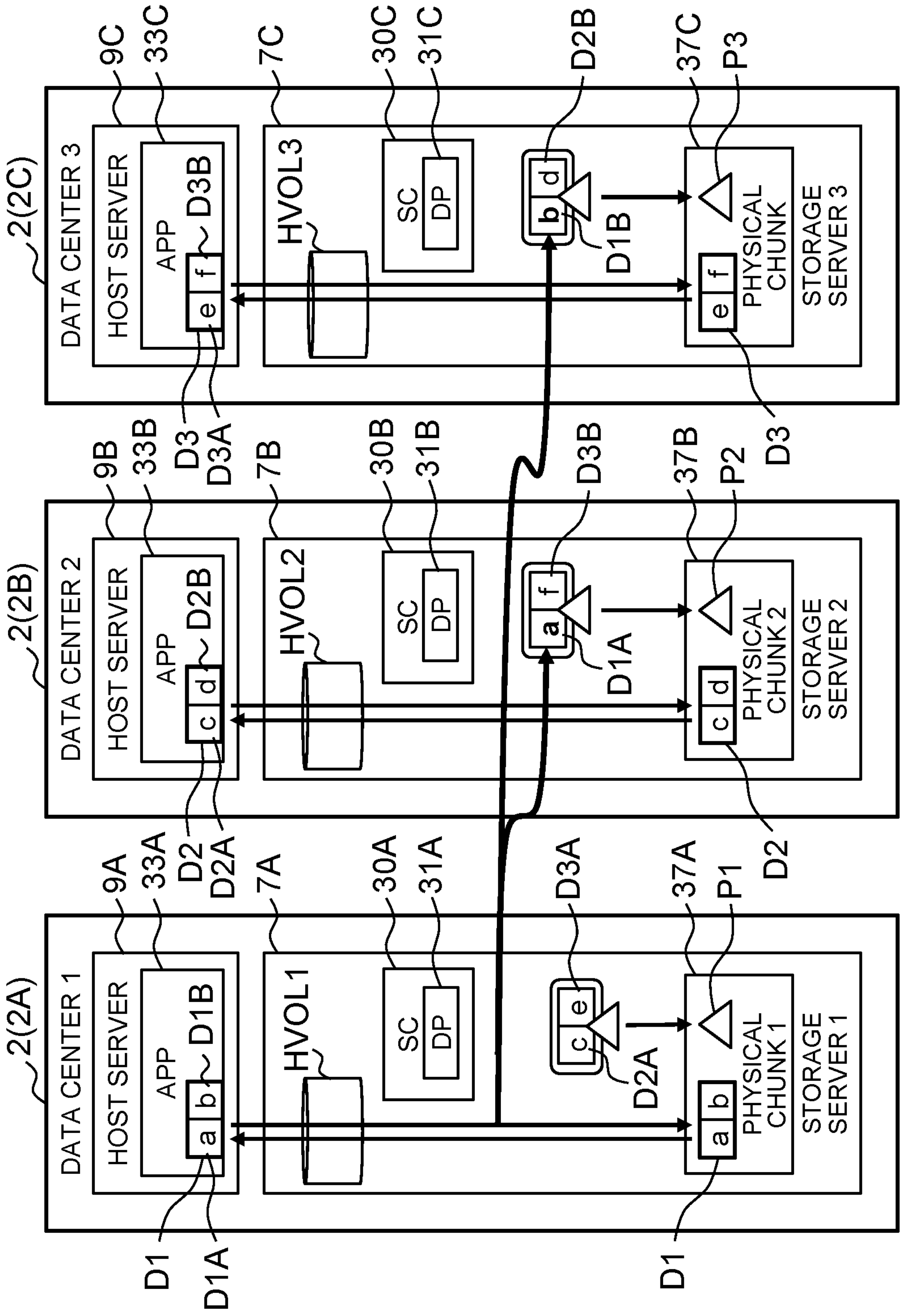
FIG. 7 is a conceptual diagram explaining the redundancy of user data in the storage system.

In the following explanation, as shown in FIG. 7, let it be assumed that a host server in the first data center 2A writes first user data D1 (data configured from "a" and "b" in the diagram) in a host volume HVOL within the first storage server 7A, and the first user data D1 is stored in the first physical chunk 37A within the first storage server 7A.

Moreover, let it be assumed that a second physical chunk 37B configuring the same chunk group 38 as the first physical chunk 37A exists in the second storage server 7B within the second data center 2B, and second user data D2 (data configured from "c" and "d" in the diagram) is stored in the same storage area in the second physical chunk 37B as the storage area where the first user data D1 is stored in the first physical chunk 37.

Similarly, let it be assumed that a third physical chunk 37C configuring the same chunk group 38 as the first physical chunk 37A exists in the third storage server 7C within the third data center 2C, and third user data D3 is stored in the same storage area in the third physical chunk 37C as the storage area where the first user data D1 in the first physical chunk 37A.

In the foregoing configuration, when the first application 33A installed in the first host server 9A within the data center 2A writes the first user data D1 in the first host volume HVOL1 that has been assigned to itself, the first user data D1 is directly stored in the first physical chunk 37A by the data plane 31A of the corresponding storage controller 30A.

Moreover, the data plane 31A divides the first user data D1 into two partial data D1A, D1B of the same size indicated as "a" and "b", transfers one partial data D1A ("a" in the diagram) of the partial data D1A, D1B to the second storage server 7B providing the second physical chunk 37B in the second data center 2B, and transfers the other partial data D1B ("b" in the diagram) to the third storage server 7C providing the third physical chunk 37C in the third data center 2C.

In addition, the data plane 31A reads one partial data D2A ("c" in the diagram) of the two partial data D2A, D2B of the same size indicated as "c" and "d", which were obtained by dividing the second user data D2, from the second physical chunk 37B via the data plane 31B of the corresponding storage controller 30B of the second storage server 7B in the second data center 2B. Moreover, the data plane 31A reads one partial data D3A ("e" in the diagram) of the two partial data D3A, D3B of the same size indicated as "e" and "f", which were obtained by dividing the third user data D3, from the third physical chunk 37C via the data plane 31C of the corresponding storage controller 30C of the third storage server 7C in the third data center 2C. Subsequently, the data plane 31A generates a parity P1 from the read partial data D2A indicated as "c" and the read partial data D3A indicated as "e", and stores the generated parity P1 in the first physical chunk 37A.

When the partial data D1A indicated as "a" is transferred from the first storage server 7A, the data plane 31B of the storage controller 30B associated with the second physical chunk 37B in the second storage server 7B reads one ("f" in the diagram) of either the partial data D3A, D3B indicated as "e" and "f" described above from the third physical chunk 37C via the data plane 31C of the corresponding storage controller 30C of the third storage server 7C in the third data center 2C. Moreover, the data plane 31B generates a parity P2 from the read partial data D3B indicated as "f" and the partial data D1A indicated as "a", which was transferred from the first storage server 7A, and stores the generated parity P2 in the second physical chunk 37B.

Moreover, when the partial data D1B indicated as "b" is transferred from the first storage server 7A, the data plane 31C of the storage controller 30C associated with the third physical chunk 37C in the third storage server 7C reads one ("d" in the diagram) of the partial data D2A, D2B indicated as "c" and "d" described above from the second physical chunk 37B, via the data plane 31B of the corresponding storage controller 30B of the second storage server 7B installed in the second data center 2B. Moreover, the data plane 31B generates a parity P3 from the read partial data D2B indicated as "d" and the partial data D1B indicated as "b", which was transferred from the first storage server 7A, and stores the generated parity P3 in the third physical chunk 37C.

The foregoing processing is similarly performed when, in the second data center 2B, the second application 33B installed in the second host server 9B writes the user data D2 in the second host volume HVOL2 of the second storage server 7B, or when, in the third data center 2C, the third application 33C installed in the third host server 9C writes the user data D3 in the third application 33C of the third storage server 7C.

Based on this kind of redundancy processing of the user data D1 to D3, while making redundant the first to third user data D1 to D3 used by the first to third applications 33A to 33C installed in the first to third host servers 9A to 9C, the first to third user data D1 to D3 can constantly be retained in the same first to third data centers 2A to C as the first to third applications 33A to 33C. If a failure occurs in the host server 9, the user data stored in the host server 9 can be restored by using the parity, and the user data stored in another host server 9 that was used as the basis for generating that parity. It is thereby possible to prevent the data transfer between the first to third data centers 2A to 2C of the first to third user data D1 to D3 used by the first to third applications 33A to 33C, and avoid deterioration in the I/O performance and increase in the communication cost caused by such data transfer. The number of user data and the number of parities may be set to an arbitrary number regardless of 2D1P.

In order to manage this kind of redundancy group 36 (FIG. 5) and chunk group 38 (FIG. 6), the control plane 32 of each storage controller 30 manages the storage controller management table 40 shown in FIG. 8 and the chunk group management table 41 shown in FIG. 9 as a part of the metadata described above.

The storage controller management table 40 is a table for managing the foregoing redundancy group 36 set by the administrator or user, and is configured by comprising, as shown in FIG. 8, a redundancy group ID column 40A, an active server ID column 40B and a standby server ID column 40C. In the storage controller management table 40, one line corresponds to one redundancy group 36.

The redundancy group ID column 40A stores an identifier (redundancy group ID) that was assigned to the corresponding redundancy group 36 and which is unique to that redundancy group 36, and the active server ID column 40B stores a server ID of the storage server 7 installed with the storage controller 30 that was set to the active mode within the corresponding redundancy group 36. Moreover, the standby server ID column 40C stores a server ID of the storage server 7 installed with each of the storage controllers 30 that were set to the standby mode within that redundancy group 36.

Accordingly, the example of FIG. 8 shows that, in the redundancy group 36 to which a redundancy group ID of "1" has been assigned, the storage controller 30 set to the active mode is installed in the storage server 7 to which a server ID of "100" has been assigned, and the remaining two storage controllers 30 set to the standby mode are respectively installed in the storage server 7 to which a server ID of "200" has been assigned and in the storage server 7 to which a server ID of "300" has been assigned.

Moreover, the chunk group management table 41 is a table for managing the foregoing chunk group 38 set by the administrator or user, and is configured by comprising, as shown in FIG. 9, a chunk group ID column 41A, a data protection policy column 41B and a physical chunk ID column 41C. In the chunk group management table 41, one line corresponds to one chunk group 38.

The chunk group ID column 41A stores an identifier (chunk group ID) that was assigned to the corresponding chunk group 38 and which is unique to that chunk group 38, and the data protection policy column 41B stores a data protection policy which was set to that chunk group 38. As the data protection policy, there are, for example, "mirroring" of storing the same data, and the "second method of EC". With these methods, since the user data is stored in the storage server 7 within the own data center 2, the user data can be read without performing any communication between the availability zones, the read performance is high and the network load is low.

Accordingly, the example of FIG. 9 shows that the data protection policy of the chunk group 38 to which a chunk group ID of "0" was assigned is "mirroring", and that the chunk group 38 is configured from the physical chunk 37 to which a physical chunk ID of "100" was assigned, a physical chunk 37 to which a physical chunk ID of "200" was assigned, and a physical chunk 37 to which a physical chunk ID of "300" was assigned. In other words, data is stored in the own data center 2, and mirror data is transferred to and stored in another data center 2.

The storage controller management table 40 and the chunk group management table 41 are updated by the control plane 32 of the storage controller 30 retaining that storage controller management table 40 and chunk group management table 41, for example, when a fail-over occurs in one of the redundancy groups 36 and the configuration of that redundancy group 36 is changed, or when a new network drive 8 is logically connected to the storage server 7.

Figure 10:
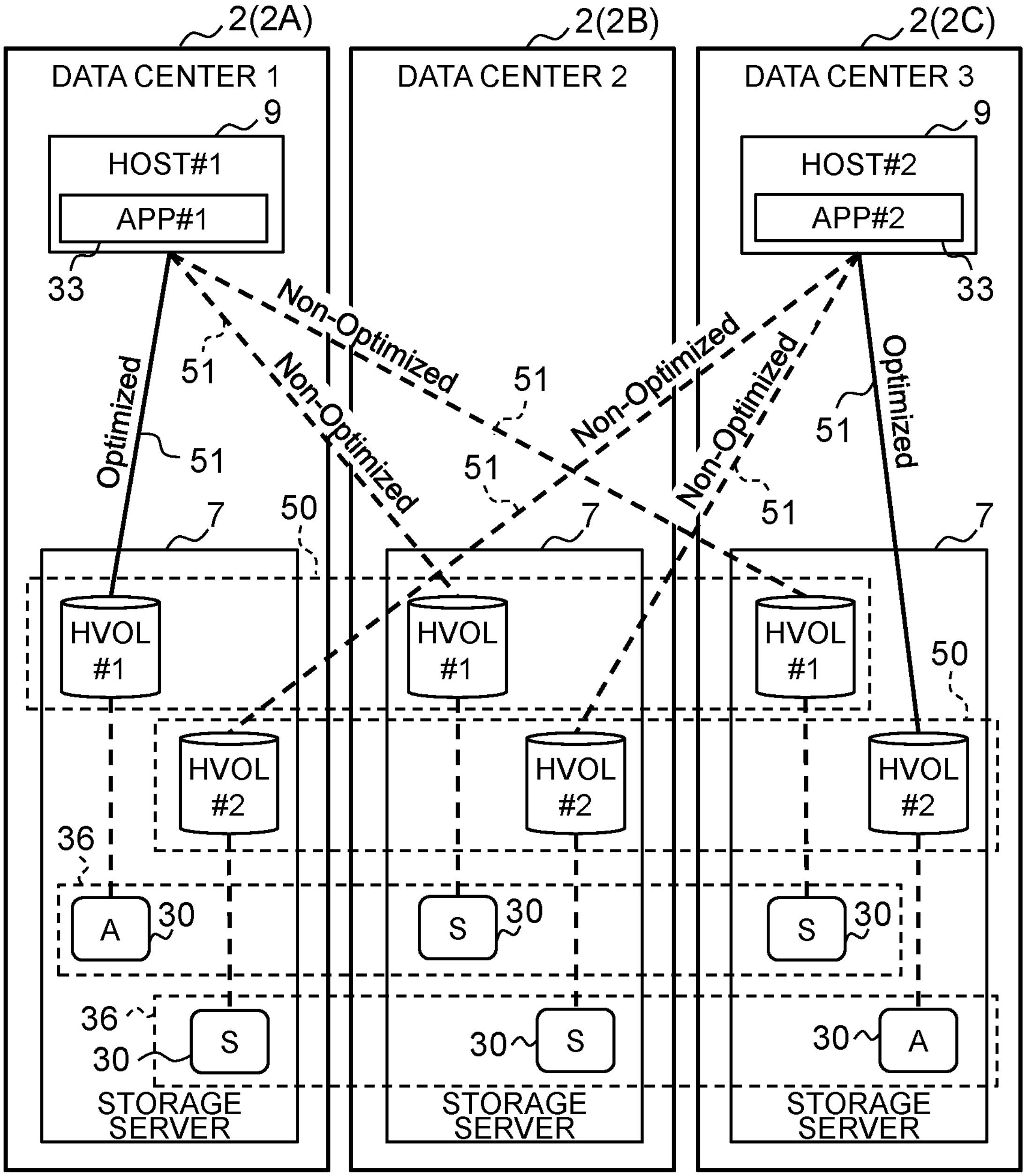
FIG. 10 is a conceptual diagram explaining the method of controlling access from the application to the host volume.

FIG. 10 shows the control method of access from the application 33 mounted in the host server 9 to the host volume HVOL in the storage server 7. In the storage system 10, a host volume HVOL is created in each storage server 7 installed with the storage controller 30 by being associated with each storage controller 30 configuring the redundancy group 36. Moreover, these host volumes HVOL are provided as the same host volume HVOL to the application 33 installed in the host server 9. In the following example, an aggregate of the host volumes HVOL each provided by being associated with each storage controller 30 configuring the redundancy group 36 is hereinafter referred to as a host volume group 50.

Based on the information notified from the storage controller 30 associated with the corresponding host volume HVOL upon logging into each host volume HVOL within each storage server 7, the application 33 sets, among the paths 51 to each of the provided host volumes HVOL, the path 51 to the host volume HVOL associated with the storage controller 30 set to the active mode in the corresponding redundancy group 36 to an "Optimized" path as the path 51 to be used for accessing the user data, and sets the paths 51 to the other host volumes HVOL to a "Non-Optimized" path. Moreover, the application 33 accesses the user data via an optimized path at all times. Accordingly, access from the application 33 to the host volume HVOL will constantly be made to the host volume HVOL associated with the storage controller 30 set to the active mode.

Here, since the storage controller 30 set to the active mode stores user data in a physical storage area provided by the network drive 8 (FIG. 1) in the same data center 2 connected to the storage server 7 installed with that storage controller 30 as described above, its user data constantly exists in the same data center 2 as the application 33. Consequently, data transfer between the data centers 2 will not occur when the application 33 accesses user data, and it is thereby possible to avoid deterioration in the I/O performance and increase in the communication cost caused by such data transfer.

FIG. 11 shows the host volume management table 52 to be used for managing the host volume HVOL created by the storage server 7 as described above. The host volume management table 52 is a table used for managing the location of the host volume HVOL associated with the storage controller 30 set to the active mode (this is hereinafter referred to as the "owner host volume HVOL") among a plurality of host volumes HVOL provided as the same host volume HVOL to the application 33 installed in the host server 9.

In effect, the host volume management table 52 is configured by comprising a host volume (HVOL) ID column 52A, an owner data center ID column 52B, an owner server ID column 52C and a size column 52D. In the host volume management table 52, one line corresponds to one owner host volume HVOL provided to the application 33 installed in the host server 9.

The host volume ID column 52A stores a volume ID of the host volume (including the owner host volume) HVOL provided to the application 33 installed in the host server 9, and the size column 52D stores a volume size of that host volume HVOL. Moreover, the owner data center ID column 52B stores a data center ID of the data center (owner data center) 2 including the owner host volume HVOL among the host volumes HVOL, and the owner server ID column 52C stores a server ID of the storage server (owner server) 7 in which the owner host volume HVOL was created.

Accordingly, the example of FIG. 11 shows that the size of the host volume HVOL recognized by the application 33 based on a host volume ID of "1" is "100 GB", and that the owner host volume HVOL was created in the storage server 7, to which a server ID of "100" was assigned, within the data center 2 to which a data center ID of "1" was assigned.

(1-2) Flow of Fail-Over at the Time of Occurrence of a Failure

Figure 12:
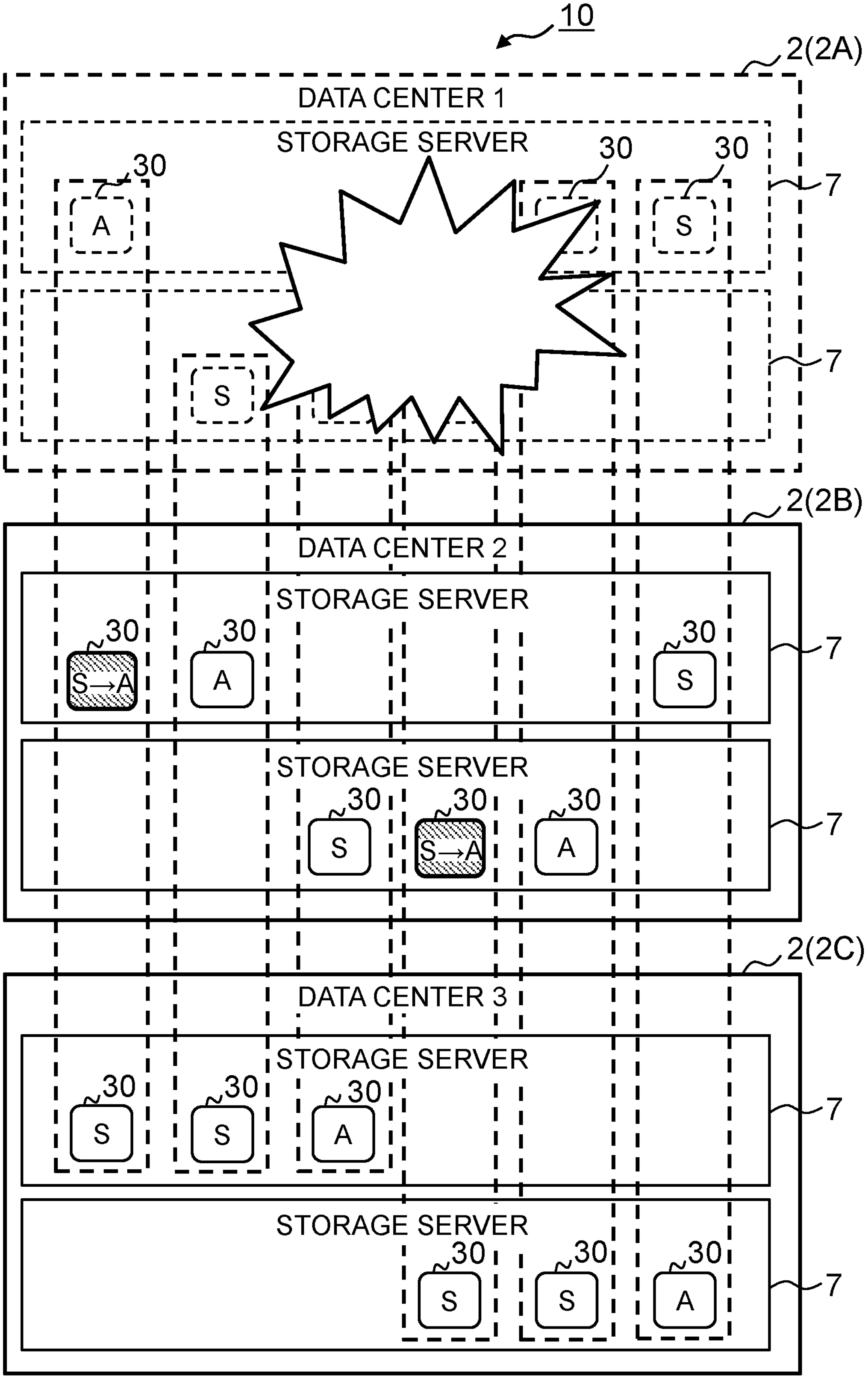
FIG. 12 is a conceptual diagram explaining a fail-over at the time of occurrence of a failure in units of data centers.

The flow of the fail-over processing to be executed in the storage system 10 of this embodiment if a failure occurs in units of data centers is now explained. FIG. 12 shows the state of the fail-over that is executed if a failure in units of data centers occurs in one of the data centers 2 (here, let it be assumed that this is the first data center 2A) from the normal state shown in FIG. 5.

In the storage system 10, by exchanging heartbeat signals with the control plane 32 of other storage controllers 30 configuring the same redundancy group 36 as the own storage controller 30 at a prescribed cycle, the control plane 32 (FIG. 3) of each storage controller 30 performs alive monitoring of each storage server 7 installed with these other storage controllers 30. When the control plane 32 is unable to receive a heartbeat signal from the control plane 32 of the storage server 7 of the monitoring destination for a given period of time, the control plane 32 determines that a failure has occurred in that storage server 7, and blocks that storage server (this is hereinafter referred to as the "failed storage server") 7.

Moreover, if an active mode storage controller 30 of any redundancy group 36 exists in the failed storage server 7 that was blocked, the operating mode of the storage controller 30 with the second highest priority after that storage controller 30 in that redundancy group 36 is switched to an active mode, and the processing that was being executed by the original active mode storage controller (this is hereinafter referred to as the "original active storage controller") 30 until then is taken over by the storage controller (this is hereinafter referred to as the "new active storage controller") 30 that was newly set to the active mode.

For example, with the redundancy group 36 shown in the left end of FIG. 12 or the fourth redundancy group 36 from the left end, since the storage controller 30 that had been installed in the first data center 2A in which a failure occurred was in the active mode, the operating mode of the storage controller 30 (each storage controller 30 shown with diagonal lines in FIG. 12) in the second data center 2B configuring the same redundancy group 36 is switched to the active mode. Accordingly, here, the I/O processing that was being executed by the original active storage controller 30 installed in the blocked storage server 7 will be executed by being taken over by the new active storage controller 30 in the second data center 2B.

Thus, the new active storage controller 30 that took over the processing of the original active storage controller 30 restores the user data based on the data and parity existing in the remaining data centers 2B, 2C, in which a failure has not occurred, when the data protection policy applied to the physical chunk 37 storing the user data is the second method of the foregoing EC. Moreover, the new active storage controller 30 stores the restored user data in the physical chunk 37 (FIG. 6) associated with the host volume HVOL in the own storage server 7 configuring the same host volume group 50 (FIG. 10) as the host volume in the failed storage server (this is hereinafter referred to as the "failed host volume") which was originally storing that user data. When the data protection policy is "mirroring", mirror data is used as the user data. When the data centers 2 are different, mirror data that became user data is migrated to the same data center 2 as the new active storage controller 30.

Figure 13:
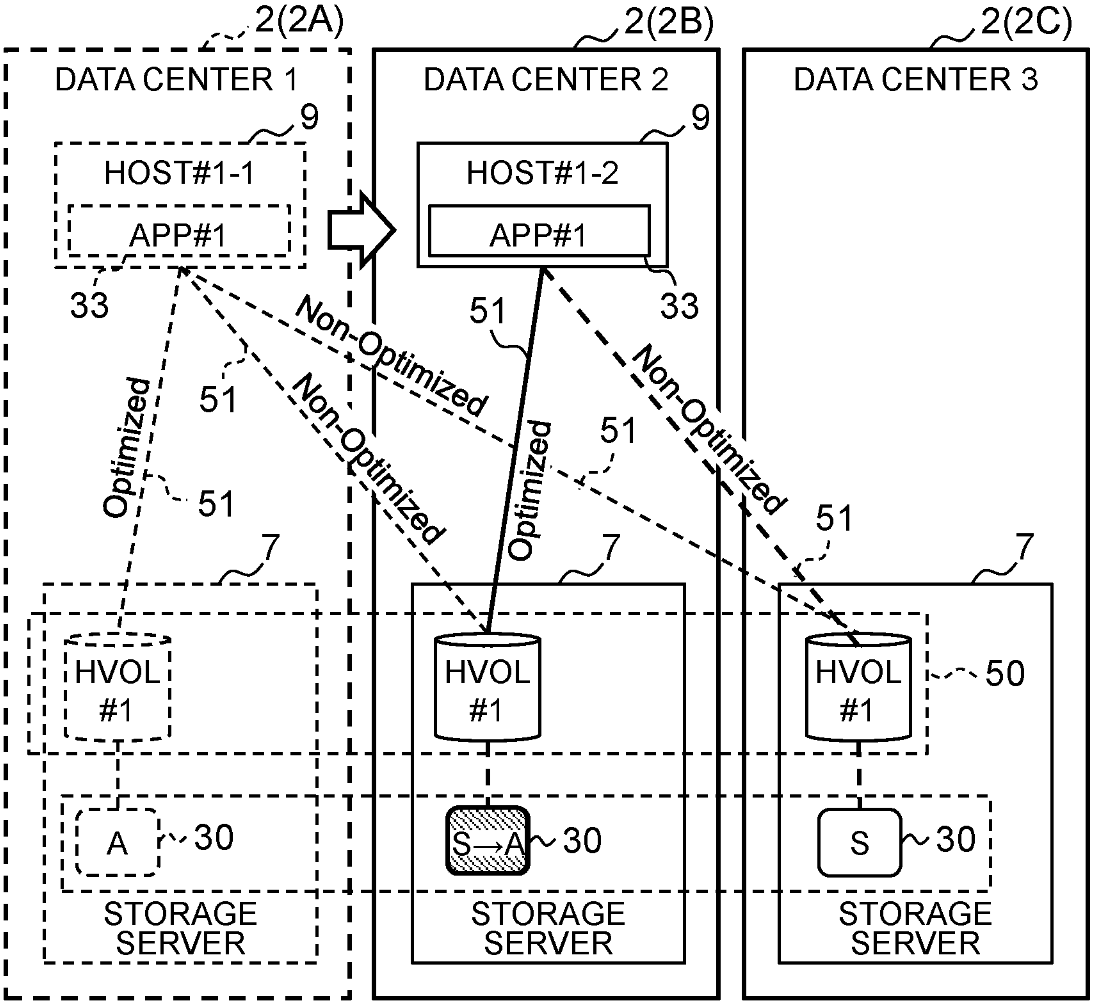
FIG. 13 is a conceptual diagram explaining the switching of the access path to the host volume associated with the migration of the application.

Furthermore, when the management server 4 detects the occurrence of a failure in units of data centers in one of the data centers 2 or a failure in units of storage servers 7, as shown in FIG. 13, the same application 33 as the application 33 (this is hereinafter referred to as the "failed application 33") of the host server 9 that was reading/writing user data from and to the host volume (failed host volume) HVOL in the storage server (failed storage server) 7, in which a failure occurred, is activated with the host server 9 in the data center 2 including the new active storage controller 30, and the management server 4 causes the application 33 to take over the processing that was being executed by the failed application 33 until then.

The path 51 from the application 33 that took over the processing of the failed application 33 to the host volume HVOL associated with the new active storage controller 30 is set to an "Optimized" path, and the paths 51 to other host volumes HVOL are set to a "Non-Optimized" path. The application 33 that took over the processing of the failed application 33 can thereby access the restored user data.

Accordingly, in the storage system 10, since the same application 33 as the failed application 33 is activated in the same data center 2 as the new active storage controller 30 that took over the processing of the original active storage controller 30 at the time of occurrence of a failure to enable that application 33 to continue the processing, in the group configured from the host servers 9 in each data center 2 (this is hereinafter referred to as the "host server group"), each host server 9 retains the same application 33 and information required for that application 33 to execute processing (this is hereinafter referred to as the "application meta information").

In the host server group, when the application meta information of one of the applications 33 installed in one of the host servers 9 is updated, the difference of the application meta information before and after the update is transferred as difference data to another host server 9 belonging to the host server group. Moreover, when the other host server 9 receives the transfer of the difference data, the other host server 9 updates the application meta information retained by that host server 9 based on the difference data. The content of the application meta information retained by each host server 9 configuring the same host server group will constantly be maintained in the same state.

As a result of each host server 9 configuring the host server group constantly retaining the application meta information of the same content as described above, even if a host server 9 or a storage server 9 of one of the data centers 2 becomes inoperable due to a failure, the processing that was being executed by the application 33 installed in that host server 9 can be immediately taken over by the same application 33 installed in the host server 9 of another data center 2.

Figure 14:
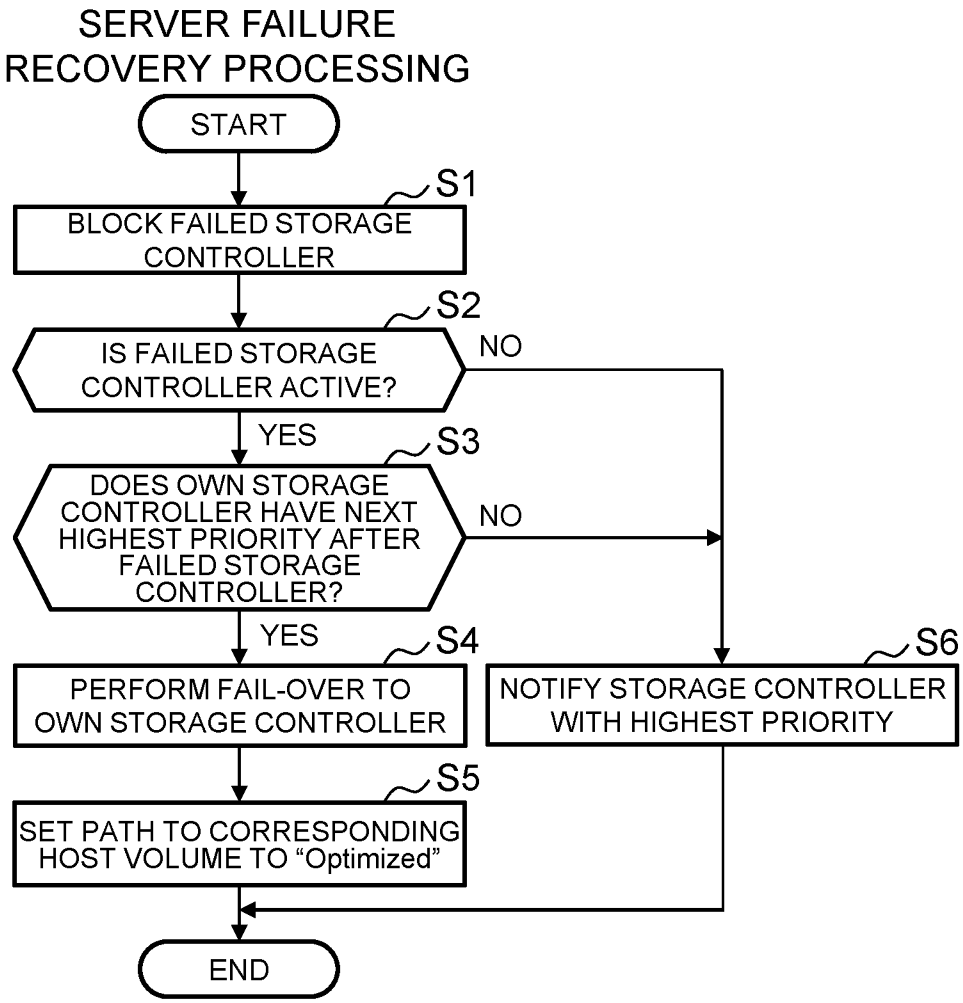
FIG. 14 is a flowchart showing the processing routine of the server failure recovery processing.

FIG. 14 shows the flow of the server failure recovery processing to be executed when the control plane 32 of the storage controller 30 detects a failure (including a failure in units of data centers) in the storage server 7 including another storage controller 30 configuring the same redundancy group 36 as that storage controller 30.

When the control plane 32 is unable to receive a heartbeat signal from the control plane 32 of another storage controller 30 configuring the same redundancy group 36 as the own storage controller 30 for a given period of time, the control plane 32 starts the server failure recovery processing shown in FIG. 14.

The control plane 32 foremost executes block processing for blocking the storage server 7 including the storage controller 30 from which a heartbeat signal could not be received for a given period of time (this is hereinafter referred to as the "failed storage controller 30") (S1). This block processing includes, for example, processing of updating the storage configuration management table 35 described above with reference to FIG. 4.

Subsequently, the control plane 32 refers to the storage controller management table 40 (FIG. 8), and determines whether the failed storage controller 30 is a storage controller set to the active mode in the redundancy group 36 to which the own storage controller 30 belongs (S2).

When the control plane 32 obtains a positive result in this determination, the control plane 32 determines whether the priority of the own storage controller 30 is the second highest priority after the failed storage controller 30 in the redundancy group 36 to which the own storage controller 30 belongs based on the metadata that it is managing (S3).

When the control plane 32 obtains a positive result in this determination, the control plane 32 executes fail-over processing for causing the own storage controller 30 to take over the processing that was being performed by the failed storage controller 30 until then (S4). This fail-over processing includes the processes of switching the operating mode of the own storage controller 30 to an active mode, notifying the storage controllers 30 other than the failed storage controller 30 in the same redundancy group 36 that the own storage controller 30 is now in an active mode, and updating the necessary metadata including the storage controller management table 40 described above with reference to FIG. 8, the chunk group management table 41 described above in FIG. 9, and the host volume management table 52 described above with reference to FIG. 11.

Next, the control plane 32 sets the path to the host volume (this is hereinafter referred to as the "fail-over destination host volume") HVOL in the storage server 7 including the own storage controller 30 configuring the same host volume group 50 as the host volume (this is hereinafter referred to as the "failed host volume") HVOL associated with the failed storage controller 30 to an "Optimized" path (S5).

Consequently, the same application 33 as the application 33 that was reading/writing data from and to the failed host volume HVOL in the data center 2, in which a failure has occurred, is thereafter activated by the management server 4 in the data center 2 where that control plane 32 exists, and, when that application 33 logs into the own storage controller 30, that control plane 32 notifies that application 33 to set the path to the corresponding host volume HVOL in the own storage controller 30 to an "Optimized" path. The application 33 thereby sets the path to that host volume HVOL to an "Optimized" path according to the foregoing notice. This server failure recovery processing is thereby ended.

Meanwhile, when the control plane 32 obtains a negative result in step S2, the control plane 32 notifies the storage controller 30 (here, the active mode storage controller 30) with the highest priority in the redundancy group 36 to which the own storage controller 30 belongs to the effect that the storage server 7 including the failed storage controller 30 has been blocked (S6).

Consequently, the storage controller 30 that received the foregoing notice executes prescribed processing such as updating the necessary metadata including the storage controller management table 40 described above with reference to FIG. 8 according to the contents of the notice. This server failure recovery processing is thereby ended.

Moreover, when the control plane 32 obtains a negative result in step S3, the control plane 32 notifies the storage controller 30 with the second highest priority after the failed storage controller 30 in the redundancy group 36 to which the own storage controller 30 belongs to the effect that the storage server 7 including the failed storage controller 30 has been blocked (S6).

Consequently, the control plane 32 of the storage controller 30 that received the foregoing notice executes the same processing as step S4 and step S5. This server failure recovery processing is thereby ended.

(1-3) Flow of Creation of a Host Volume

The flow up to the user creating the owner host volume HVOL of the intended volume size in the intended data center 2 is now explained.

Figure 15:
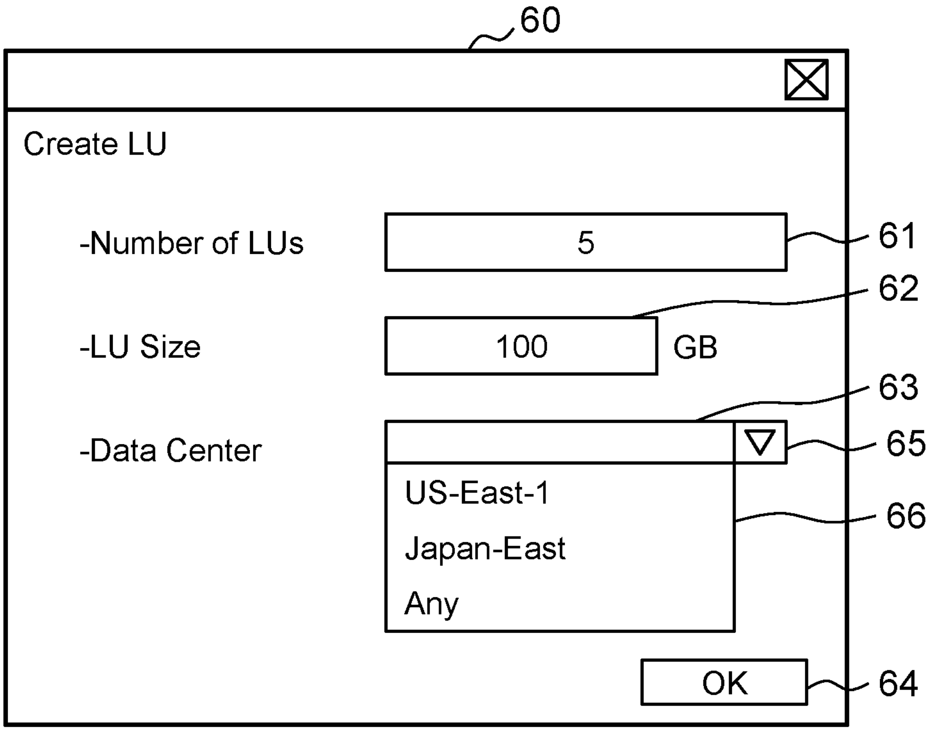
FIG. 15 is a diagram showing a screen configuration example of the host volume creation screen.

FIG. 15 shows a configuration example of the host volume creation screen 60 that may be displayed on the user terminal 6 (FIG. 1) based on prescribed operations. The host volume creation screen 60 is a screen for the user to create the host volume (owner host volume) HVOL associated with the active mode storage controller 30 among the host volumes HVOL provided to the application 33 installed in the host server 9.

The host volume creation screen 60 is configured by comprising a volume number designation column 61, a volume size designation column 62, a creation destination data center designation column 63, and an OK button 64.

Furthermore, with the host volume creation screen 60, the user can operate the user terminal 6 and designate the volume ID (number in this case) of the owner host volume HVOL to be created by inputting it into the volume number designation column 61, and designate the volume size of that owner host volume HVOL by inputting it into the volume size designation column 62.

Moreover, with the host volume creation screen 60, the user can display a pull-down menu 66 listing the data center ID of each data center 2 by clicking a pull-down menu 65 provided to the right side of the creation destination data center designation column 63.

Subsequently, by clicking the data center ID of the intended data center 2 among the data center IDs displayed on the pull-down menu 66, the user can designate that data center 2 as the data center 2 of the creation destination of the owner host volume HVOL. Here, the data center ID of the selected data center 2 is displayed on the creation destination data center designation column 63.

Furthermore, with the host volume creation screen 60, by clicking the OK button 64 upon designating the volume ID and volume size of the owner host volume HVOL and the data center 2 of the creation destination as described above, the user can instruct the management server 4 to create the owner host volume HVOL of that volume ID and volume size in that data center 2.

In effect, when the OK button 64 of the host volume creation screen 60 is clicked, a volume creation request including the various types of information such as the volume ID and volume size and the data center 2 of the creation destination designated by the user on the host volume creation screen 60 is created by the user terminal 6 that was displaying the host volume creation screen 60, and the created volume creation request is sent to the management server 4 (FIG. 1).

Figure 16:
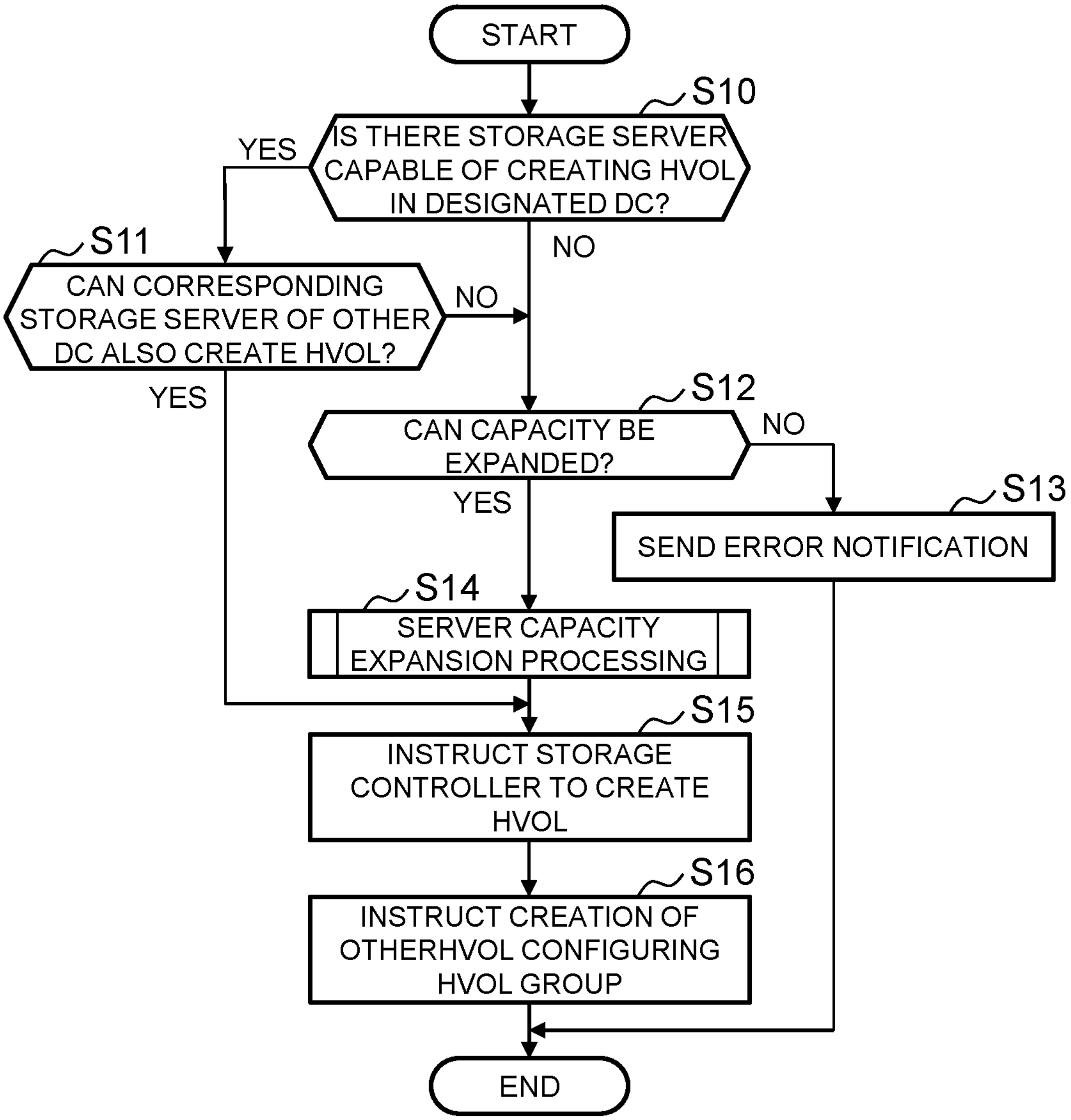
FIG. 16 is a flowchart showing the processing routine of the host volume creation processing.

When the management server 4 receives the volume creation request, the owner host volume HVOL of the requested volume ID and volume size is created in one of the storage servers 7 in the designated data center 2 according to the processing routine shown in FIG. 16.

In effect, the management server 4 starts the host volume creation processing shown in FIG. 16 upon receiving the volume creation request, and foremost determines whether there is a storage server 7 having a capacity capable of creating the owner host volume HVOL of the volume size designated by the user within the data center 2 designated as the creation destination of the owner host volume HVOL in the volume creation request (this is hereinafter referred to as the "designated data center 2") (S10).

Specifically, the management server 4 makes an inquiry to one of the storage controllers 30 installed in each storage server 7 of the designated data center 2 regarding the capacity and the current used capacity of the storage server 7, respectively. The management server 4 determines whether the owner host volume HVOL of the designated volume size can be created based on the capacity and the current used capacity of the storage server 7 that were respectively notified from the control plane 32 of the storage controllers 30 in response to the foregoing inquiry.

When the management server 4 obtains a positive result in this determination, the management server 4 determines whether each of the other storage controllers 30 configuring the same redundancy group 36 as the storage controller 30 (for example, existing storage controller 30 or newly created storage controller 30) to be associated with the owner host volume HVOL in the storage server 7 capable of creating the owner host volume HVOL can create the host volume HVOL of the designated volume size in the same manner as the owner host server HVOL described above (S11).

When the management server 4 obtains a positive result in this determination, the management server 4 selects one storage server 7 among the storage servers 7 in which a positive result was obtained in step S11 among the storage servers 7 determined as being able to create the owner host volume HVOL in step S10, and instructs the storage controller 30 to be associated with the owner host volume HVOL in the storage server 7 to create that owner host volume HVOL (S15). Consequently, the storage controller 30 creates the owner host volume HVOL of the designated volume size in the storage server 7 by associating it with the storage controller 30. Moreover, the operating mode of that storage controller 30 is set to the active mode.

Moreover, the management server 4 thereafter instructs each storage controller 30 in another data center 2 configuring the same redundancy group 36 as that storage controller 30 to create the host volume HVOL of the same volume size as the owner host volume HVOL (S16). Consequently, the host volume HVOL of the same volume size as the owner host volume HVOL is associated with each of these storage controller 30 by these storage controllers 30, and created in the same storage server 4 as these storage controller 30. Moreover, the operating mode of these storage controllers 30 is set to the standby mode.

Note that, in step S15 and step S16 described above, the association of each host volume HVOL (including the owner host volume HVOL) newly created in each data center 2 and the storage controller 30, and the setting of the operating mode (active mode or standby mode) of the storage controller 30 to be associated with each of these host volumes HVOL may also be performed manually by the administrator or the user of the storage system 10. The same applies in the following explanation.

Meanwhile, when the management server 4 obtains a negative result in the determination of step S10 or step S11, the management server 4 determines whether there is a storage server 7 capable of expanding the capacity until it can create the designated host volume HVOL among the respective storage servers 7 in the designated data center 2 (S12).

Specifically, the management server 4 makes an inquiry to one of the storage controllers 30 installed in one of the storage servers 7 of the designated data center 2 regarding the number of network drives 8 (FIG. 1) logically connected to each storage server 7 in the designated data center 2. This is in order to confirm whether it is possible to expand the capacity by additionally connecting a network drive 8 to each storage server 7 since the number of network drives 8 that can be logically connected to the storage server 7 is already decided.

Moreover, the management server 4 makes an inquiry to the storage controller 30 regarding the number of network drives 8 installed in the designated data center 2 and not logically connected to any of the storage servers 7 and the capacity of these network drives 8. The management server 4 determines whether there is a storage server 7 capable of expanding its capacity until it can create the designated host volume HVOL in the designated data center 2 by additionally connecting a network drive 8 in the designated data center 2 based on the various types of information obtained in the manner described above.

Here, if there is a storage server 7 that can be expanded, the management server 4 determines whether a storage server 7 of another data center 2 including another storage controller 30 configuring the redundancy group 36 and the storage controller 30 to be associated with the owner host volume HVOL in that storage server 7 can also be expanded in the same capacity. This is because it is necessary to create a host volume HVOL of the same volume size as the owner storage controller 30 regarding these storage servers 7.

When the management server 4 obtains a negative result in the determination of step S12, the management server 4 sends an error notification to the user terminal 6 of the transmission source of the volume creation request described above (S13), and thereafter ends this volume creation processing. Consequently, a warning to the effect that the designated host volume HVOL cannot be created is displayed on the user terminal 6 based on the error notification.

Meanwhile, when the management server 4 obtains a positive result in the determination of step S12, the management server 4 executes the server capacity expansion processing of selecting one storage server 7 among the storage servers 7 in the designated data center 2 in which the expansion of the capacity was determined to be possible in step S12 (including the capacity expansion of the corresponding storage server 7 in another data center 2), and expanding the capacity of the storage server 7 that was selected (this is hereinafter referred to as the "selected storage server 7") by additionally logically connecting a network drive 8 to the selected storage server 7 (S14).

Moreover, the management server 4 instructs the storage controller 30 to be associated with the owner host volume HVOL in the selected storage server 7 with an expanded capacity to create the owner host volume HVOL (S15). Consequently, the owner host volume HVOL of the volume size designated by that storage controller 30 is created in the same storage server 7 as that storage controller 30 by being associated with that storage controller 30. Moreover, the operating mode of that storage controller 30 is set to the active mode.

Moreover, the management server 4 thereafter also instructs each storage controller 30 in another data center 2 configuring the same redundancy group 36 as that storage controller 30 to create a host volume HVOL of the same volume size as the owner host volume HVOL (S16). Consequently, the host volumes HVOL of the same volume size as the owner host volume HVOL are each created by these storage controllers 30 in the same storage server 7 as these storage controllers 30 by being associated with these storage controllers 30. Moreover, the operating mode of these storage controllers 30 is set to the standby mode.

The management server 4 thereafter ends this host volume creation processing.

Figure 17:
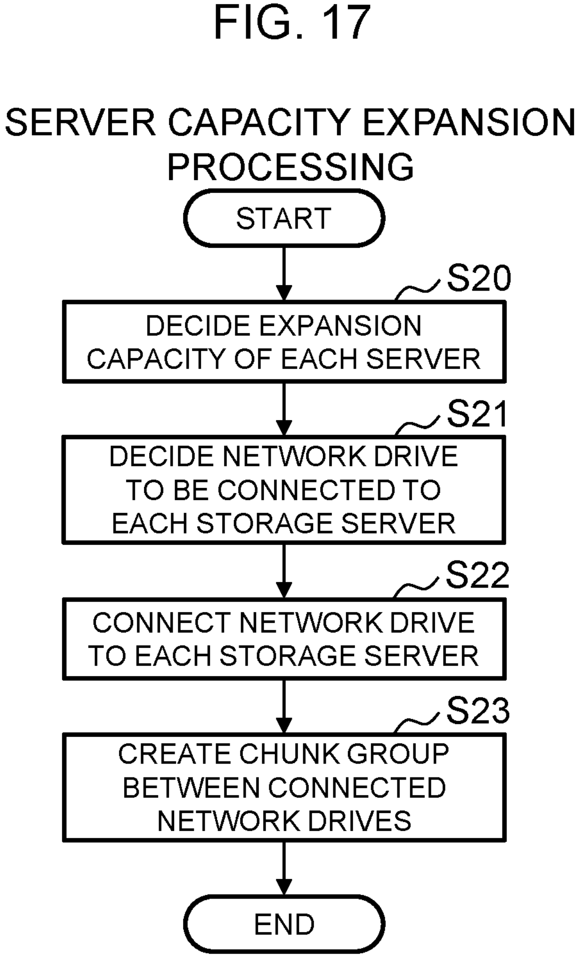
FIG. 17 is a flowchart showing the processing routine of the server capacity expansion processing.

Note that the flow of the server capacity expansion processing executed by the management server 4 in step S14 of this host volume creation processing is shown in FIG. 17.

The management server 4 starts the server capacity expansion processing shown in FIG. 17 upon proceeding to step S14 of FIG. 16, and foremost decides each expansion capacity of the storage servers 7 (these storage servers 7 are hereinafter referred to as the "capacity expansion target storage servers 7") in each data center 2 including each of the storage controllers 30 to be associated with each of the host volumes HVOL (including the owner host volume HVOL) configuring the host volume group 50 (FIG. 10) to which the owner host volume HVOL belongs (S20).

Subsequently, the management server 4 decides each of the network drives 8 to be logically connected to the capacity expansion target storage servers 7 so that the capacity of each capacity expansion target storage server 7 can be expanded equally (S21), and logically connects each of the decided network drives 8 to the corresponding capacity expansion target storage server 7 (S22).

Specifically, the management server 4 notifies the logical connection of the network drives 8 to the storage controllers 30 of each data center 2 to be associated with each of the host volumes HVOL configuring the host volume group. Moreover, the management server 4 instructs the active mode storage controller 30 of each redundancy group 36 in the storage system 10 to update the network drive ID column 35C corresponding to the capacity expansion target storage server 7 of the storage configuration management table 35 described above with reference to FIG. 4 to a state of adding the network drive ID of the network drive 8 that was logically connected.

Next, the management server 4 creates a chunk group 38 (FIG. 6) between the storage areas provided by each of the network drives 8 connected to each of the capacity expansion target storage servers 7, and instructs the active mode storage controller 30 of each redundancy group 36 in the storage system 10 to update the created chunk group 38 to a state in which the chunk group management table 41 described above with reference to FIG. 9 has been registered (S23). The management server 4 thereafter ends this server capacity expansion processing and proceeds to step S15 of the host volume creation processing.

(1-4) Flow of Server Used Capacity Monitoring Processing

Figure 18:
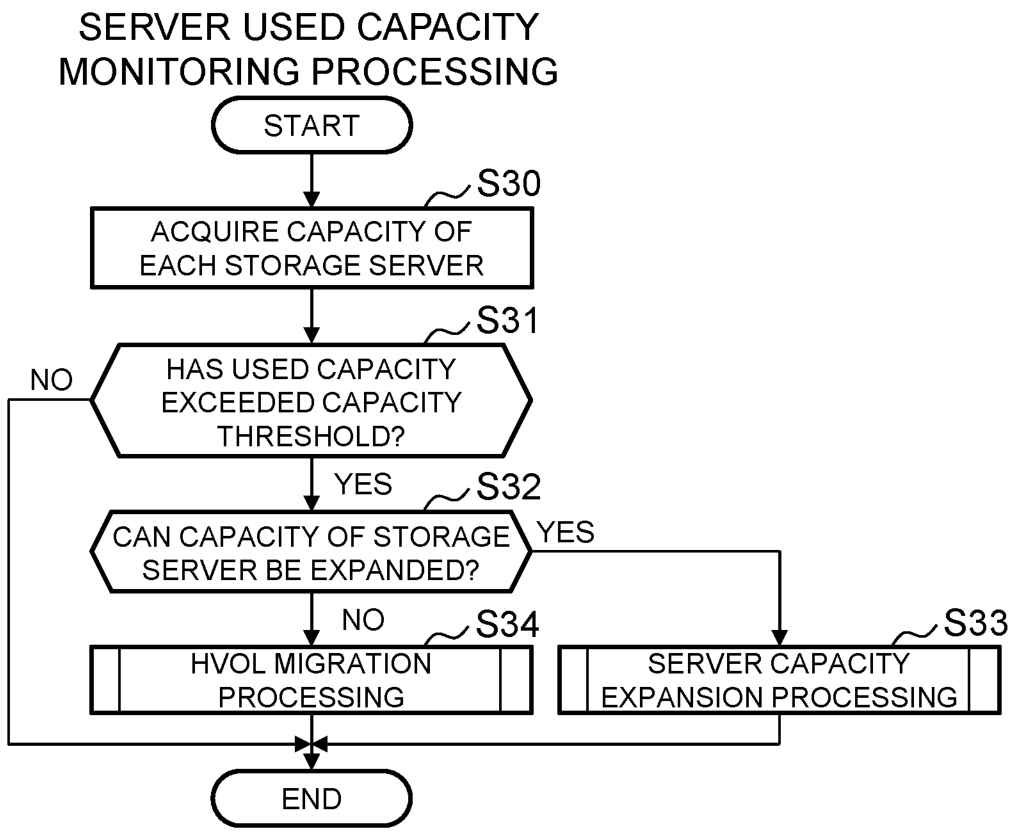
FIG. 18 is a flowchart showing the processing routine of the server used capacity monitoring processing.

Meanwhile, FIG. 18 shows the flow of the server used capacity monitoring processing to be periodically executed by the control plane (this is hereinafter referred to as the "identified control plane") 32 of the identified storage controller 30 installed in one of the storage servers 7 in each data center 2.

The identified control plane 32 monitors the used capacity of each storage server 7 in the data center (this is hereinafter referred to as the "own data center") 2 including the own storage controller 30 according to the processing routine shown in FIG. 18, and, if the used capacity of any storage server 7 exceeds a pre-set threshold (this is hereinafter referred to as the "used capacity threshold"), executes processing for expanding the capacity of that storage server 7.

In effect, when the identified control plane 32 starts the server used capacity monitoring processing shown in FIG. 18, the identified control plane 32 foremost acquires the capacity and the current used capacity of that storage server 7, respectively, from one of the storage controllers 30 installed in each storage server 7 within the own data center 2. Here, the identified control plane 32 also acquires the capacity and the current used capacity of the storage server 7 including the own storage controller 30 (S30).

Subsequently, the identified control plane 32 determines whether the used capacity of one of the storage servers 7 within the own data center 2 has exceeded the foregoing used capacity threshold based on the acquired information (S31). The identified control plane 32 ends this storage server used capacity monitoring processing upon obtaining a negative result in this determination.

Meanwhile, when the identified control plane 32 obtains a negative result in the determination of step S31, the identified control plane 32 determines whether the storage server 7 in which the used capacity has exceeded the used capacity threshold (this is hereinafter referred to as the "over-used capacity storage server 7") can be expanded in the same manner as step S12 of the host volume creation processing as described above with reference to FIG. 16 (S32).

Subsequently, when the identified control plane 32 obtains a positive result in this determination, by executing the same processing as the server capacity expansion processing described above with reference to FIG. 17, the identified control plane 32 expands the capacity of the over-used capacity storage server 7 and the capacity of the storage server 7 including the storage controller 30 installed in the over-used capacity storage server 7 and another storage controller 30 configuring the redundancy group 36, respectively, (S33), and thereafter ends this server used capacity monitoring processing.

Meanwhile, when the identified control plane 32 obtains a negative result in the determination of step S32, the identified control plane 32 executes the host volume migration processing of migrating one of the host volumes HVOL in the over-used capacity storage server 7 to a storage server 7 of a data center 2 that is the same as or different from the over-used capacity storage server 7 and which has an unused capacity which enables the migration of that host volume HVOL (S34), and thereafter ends this server used capacity monitoring processing.

Figure 19:
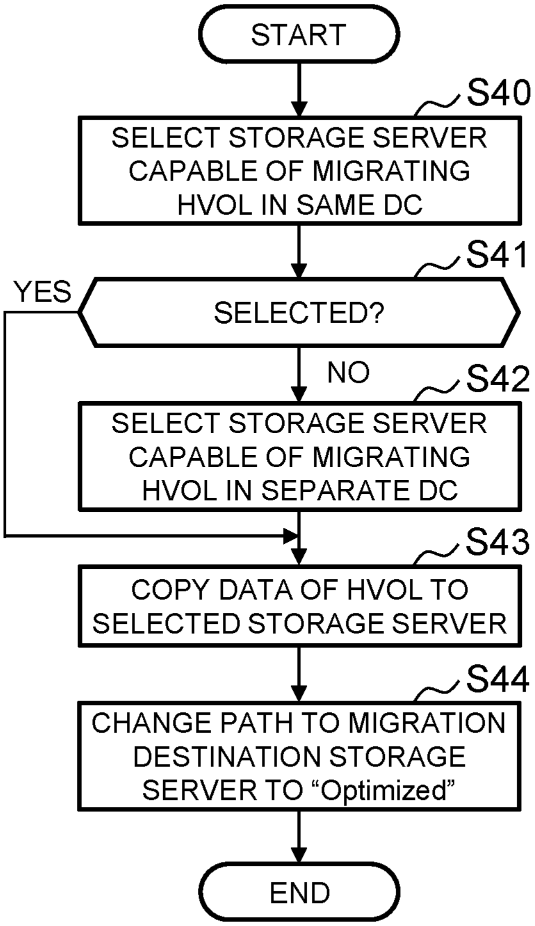
FIG. 19 is a flowchart showing the processing routine of the volume migration processing.

Note that the specific processing contents of the host volume migration processing are shown in FIG. 19. When the identified control plane 32 proceeds to step S34 of the server used capacity monitoring processing, the identified control plane 32 starts the host volume migration processing shown in FIG. 19.

The identified control plane 32 foremost selects one storage server 7 in the own data center 2 among the storage servers 7 having an unused capacity which enables the migration of one of the host volume HVOL in the over-used capacity storage server 7 based on the capacity and the current unused capacity of each storage server 7 within the own data center 2 acquired in step S30 of the server used capacity monitoring processing (S40).

Subsequently, the identified control plane 32 determines whether it was possible to select such a storage server 7 in step S40 (S41), and proceeds to step S43 when it was possible to select such a storage server 7.

Meanwhile, when the identified control plane 32 obtains a negative result in the determination of step S41, the identified control plane 32 acquires the capacity and the current used capacity of each storage server 7 within the data center 2 by making an inquiry to the control plane 32 of one of the storage controllers 30 of one of the storage servers 7 in each data center 2 which is different from the own data center 2. Subsequently, the management server 4 selects a storage server 7 having an unused capacity which enables the migration of one of the host volumes HVOL within the over-used capacity storage server 7 among the storage servers 7 in a data center 2 that is different from the own data center 2 based on the acquired information (S42).

Subsequently, the identified control plane 32 selects the migration target host volume (this is hereinafter referred to as the "migration target host volume") HVOL to be migrated to another storage server 7 among the host volumes HVOL within the over-used capacity storage server 7, and copies the data of the selected migration target host volume HVOL to the storage server 7 selected in step S40 or step S42 (S43).

Specifically, the identified control plane 32 foremost creates a host volume HVOL in the storage server 7 of the migration destination of the migration target host volume HVOL, and associates the created host volume HVOL with one of the active mode storage controllers 30 installed in that storage server 7. Subsequently, the identified control plane 32 copies the data of the migration target host volume HVOL to this host volume HVOL.

Moreover, the identified control plane 32 associates this storage controller 30 with another storage controller (this is hereinafter referred to as the "relevant storage controller") 30 within another data center 2 configuring the redundancy group 36, respectively, and also creates a host volume HVOL configuring the host volume group 50 (FIG. 10) together with a host volume HVOL, to which data of the migration target host volume HVOL has been copied, in the storage server 7 including the relevant storage controller 30, respectively.

Subsequently, the identified control plane 32 associates the created host volumes HVOL with the relevant storage controller 30 within the same storage server 7, respectively.

Next, the identified control plane 32 sets the path from the application 33 that had been reading/writing user data from and to the migration target host volume HVOL to the host volume (this is hereinafter referred to as the "data copy destination host volume") HVOL, to which data of the migration target host volume HVOL was copied, to an "Optimized" path (S44).

Consequently, if there is a login from the application 33 to the data copy destination host volume HVOL thereafter, a notice to the effect that such path should be set to an "Optimized" path is given to that application 33, that application sets that path to an "Optimized path" based on the foregoing notice, and sets the other paths to a "Non-Optimized" path. The management server thereafter ends this volume migration processing.

Note that, other than the capacity, the migration processing of the host volume HVOL between the storage servers 7 in a data center 2 may be performed for the purpose of rebalancing the load of the volume.

(1-5) Effect of this Embodiment

According to the storage system 10 of this embodiment having the foregoing configuration, since redundant data can be stored in another data center 2 (another availability zone) while securing data locality, even if a failure in units of data centers (units of availability zones) occurs in a data center 2 including an active mode storage controller 30, processing that was being performed by the storage controller 30 until then can be taken over by the storage controller 30, which was set to the standby mode, configuring the same redundancy group 36. Thus, according to this embodiment, it is possible to realize a highly available storage system 10 capable of withstanding a failure in units of availability zones.

Moreover, according to the storage controller 30, since the application 33 and the user data to be used by that application 33 can be caused to exist in the same availability zone at all times, it is possible to suppress the generation of communication across availability zones when the active mode storage controller 30 processes an I/O request from the application 33. Thus, according to the storage system 10, it is possible to suppress the deterioration in the I/O performance caused by the communication delay associated with the communication between availability zones and the incurrence of costs caused by communication between sites.

Furthermore, according to the storage system 10, even if a failure in units of data centers occurs, the storage controller 30 only needs to undergo a fail-over, and, since the application 33 and the user data are also migrated to the data center 2 of the fail-over destination, it is possible to realize a highly available system architecture capable of withstanding a failure in units of availability zones. While communication between the data centers 2 during normal operation is required for the fail-over, the communication volume is decreased in the storage system 10.

(2) Second Embodiment

Figure 20:
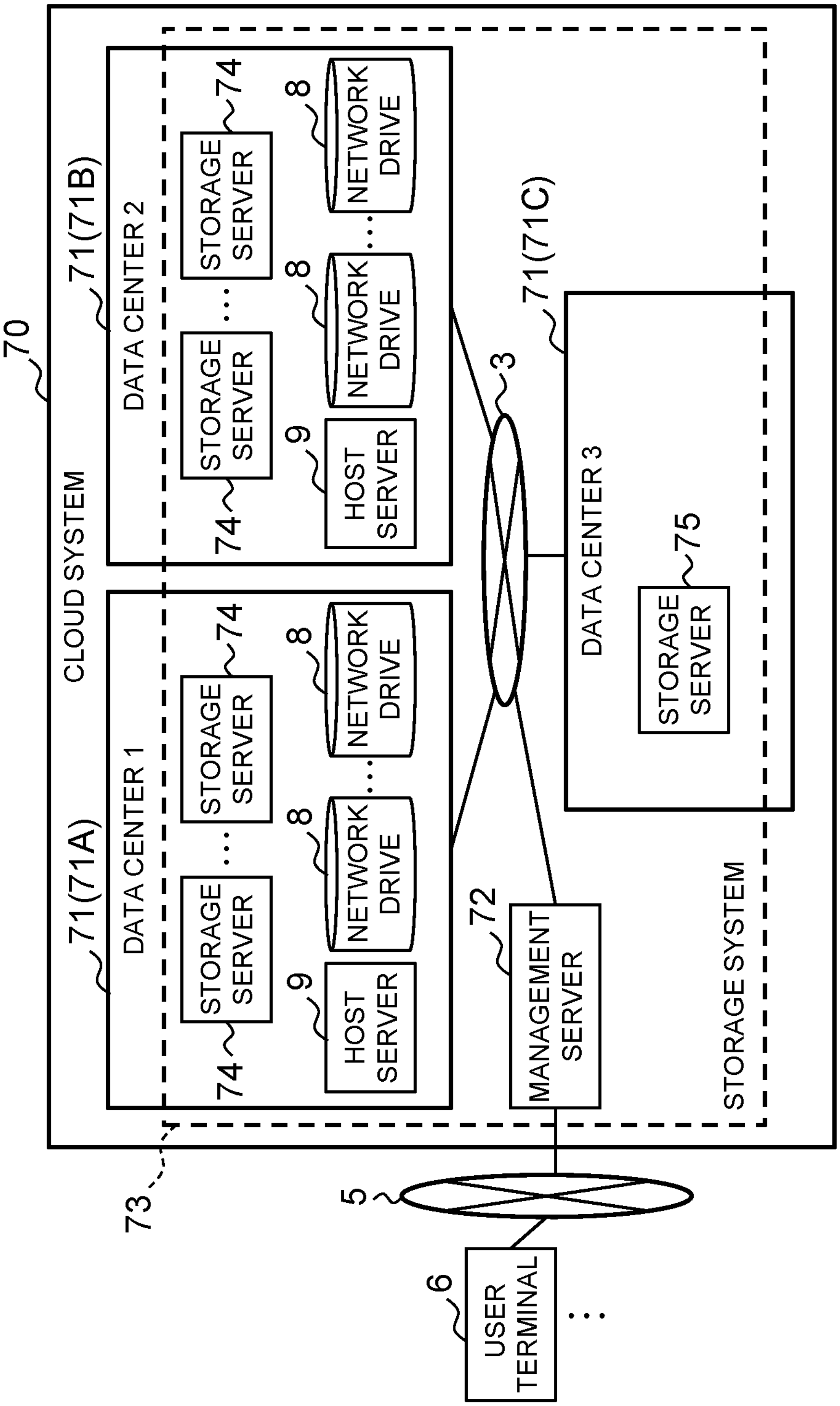
FIG. 20 is a block diagram showing the overall configuration of the storage system according to the second embodiment.

FIG. 20, in which the same reference numerals are used for parts that correspond with FIG. 1, shows a cloud system 70 according to the second embodiment. The cloud system 70 is configured by comprising first to third data centers 71A, 71B, 71C installed in mutually different availability zones.

The first to third data centers 71A to 71C are mutually connected via a dedicated network 3. Moreover, a management server 72 is connected to a dedicated network 3, and a storage system 73 is configured from the first to third data centers 71A to 71C, and the management server 72. Note that, in the following explanation, when there is no need to particularly differentiate the first to third data centers 71A to 71C, these are collectively referred to as the data centers 71.

Installed in the first and second data centers 71A, 71B are a plurality of storage servers 74 and a plurality of network drives 8 each configuring a distributed storage system. Moreover, a network drive 8 is not installed in the third data center 71C, and at least only one storage server 75 is installed. Sine the hardware configuration of these storage servers 74, 75 is the same as the storage server 4 of the first embodiment described above with reference to FIG. 2, the explanation thereof is omitted.

Figure 21:
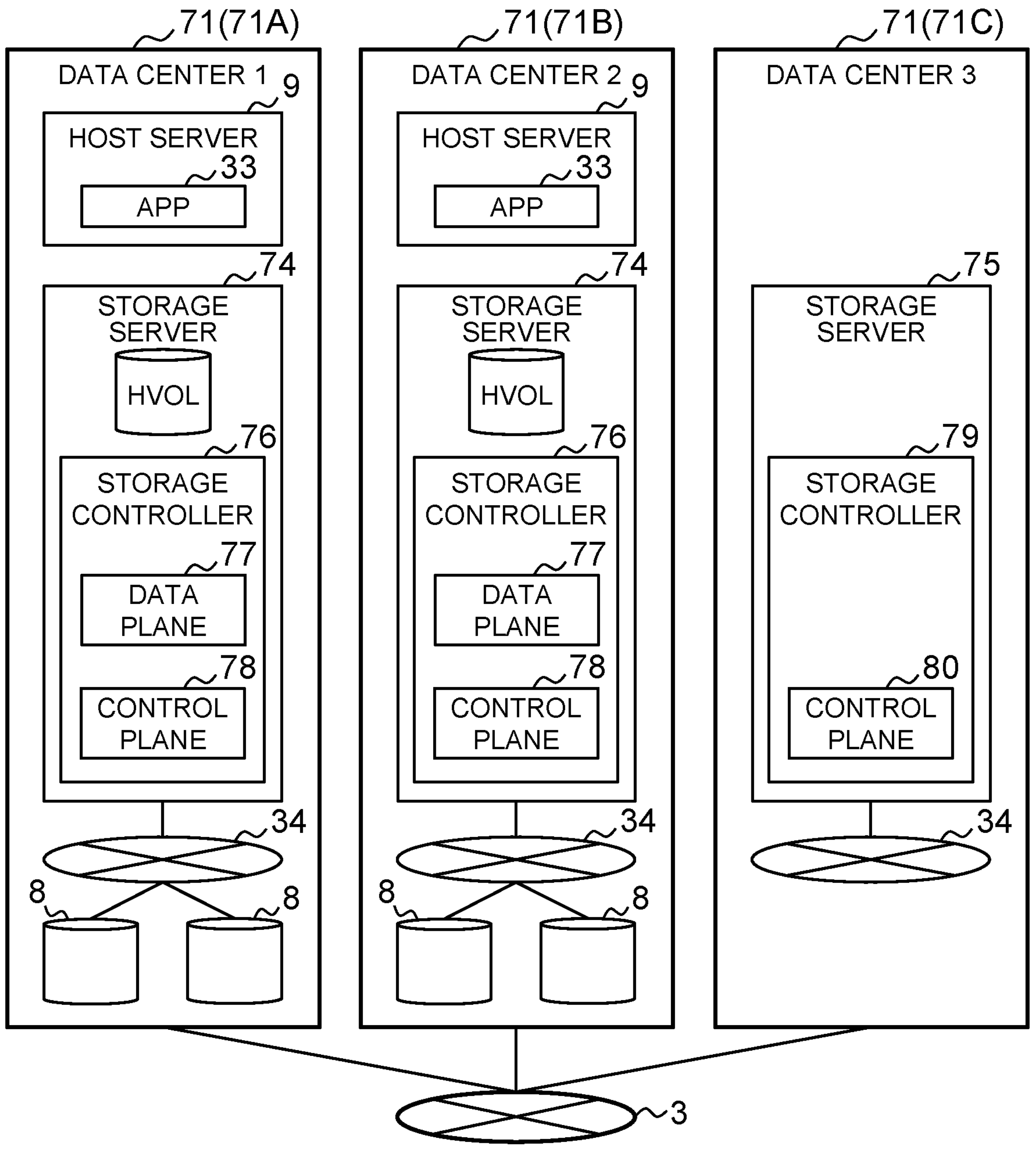
FIG. 21 is a block diagram showing the logical configuration of the storage server according to the second embodiment.

FIG. 21, in which the same reference numerals are used for parts that correspond with FIG. 3, shows the logical configuration of the storage servers 74, 75 each installed in the respective data centers 71. As shown in FIG. 21, each storage server 74 installed in the first and second data centers 71A, 71B has the same logical configuration as the storage server 7 of the first embodiment.

In effect, the storage server 74 is configured by comprising one or more storage controllers 76 having a data plane 77 and a control plane 78. The data plane 77 is a functional part having a function of reading/writing user data from and to the network drive 8 via an intra-data center network 34 according to an I/O request from the application 33 installed in the host server 9. Moreover, the control plane 78 is a functional part having a function of managing the configuration of the storage system 73 (FIG. 20).

Since the operation of the data plane 77 and the control plane 78 is the same as the operation to be executed by the storage controller 30 installed in each of the storage servers 7 in the remaining two data centers 2 if a failure in units of data centers occurs in one data center 2 in the storage system 20 of the first embodiment, the explanation thereof is omitted. Note that the redundancy of the user data in this embodiment is performed by mirroring at all times.

Meanwhile, a storage server 75 installed in a third data center 71C is configured by comprising one or more storage controllers 79 having only a control plane 80. Thus, with the storage system 73 of this embodiment, the storage server 75 of the third data center 71C cannot perform the I/O processing of user data. Thus, the third data center 71C does not have either the host server 9 or the network drive 8, and a host volume HVOL is also not created. In other words, in the case of the storage system 73, the third data center 71C is unable to retain the user data.

The control plane 80 of the storage controller 79 has the function of performing alive monitoring of the storage server 74 in the first and second data centers 71A, 71B by exchanging heartbeat signals with the control plane 78 of the storage controller 76 configuring the same redundancy group 36 (FIG. 5) installed in the storage server 74 within the first and second data centers 71A, 71B.

Figure 22:
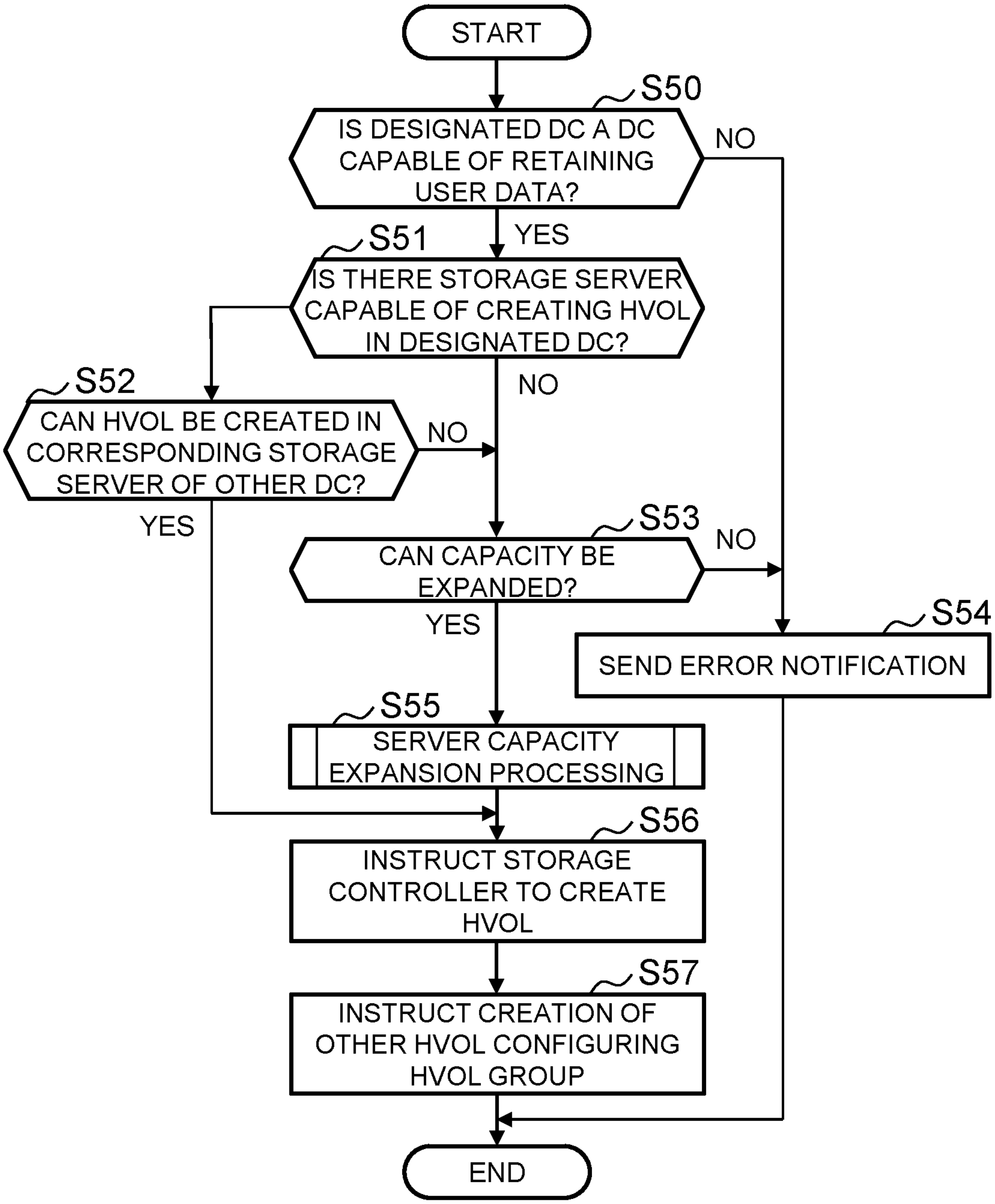
FIG. 22 is a flowchart showing the processing routine of the host volume creation processing according to the second embodiment.

FIG. 22 shows the processing routine of the host volume creation processing to be executed by the management server 72 of this embodiment in substitute for the host volume creation processing of the first embodiment described above with reference to FIG. 16 in the storage system 73 of this embodiment.

Even in the storage system 73, the user uses the host volume creation screen 60 described above with reference to FIG. 15 and instructs the management server 72 to create the owner host volume HVOL by designating the volume ID and volume size of the owner host volume HVOL to be created and the data center 71 of the creation destination, and thereafter clicking the OK button 64.

Consequently, a volume creation request including the various types of information such as the volume ID and volume size and the data center 71 of the creation destination designated by the user is created in the user terminal 6 (FIG. 20) displaying the host volume creation screen 60, and the created volume creation request is sent to the management server 72.

When the management server 72 receives the volume creation request, the management server 72 creates the owner host volume HVOL of the requested volume ID and volume size is created in one of the storage servers 74 in the data center (designated data center) 71 designated as the creation destination of the owner host volume HVOL in the volume creation request according to the processing routine shown in FIG. 22.

Specifically, the management server 72 starts the host volume creation processing shown in FIG. 22 upon receiving the volume creation request, and foremost determines whether the designated data center 71 in the volume creation request is a data center 71 capable of retaining user data (S50).

For example, by making an inquiry to the control planes 78, 80 of one of the storage controllers 76 in the data center (designated data center) 71 designated as the creation destination of the owner host volume HVOL in the volume creation request regarding the number of network drives 8 each logically connected to each of the storage servers 74, 75 in the designated data center 71, it is possible to determine whether the designated data center 71 is a data center capable of retaining data.

When the management server 72 obtains a negative result in this determination, the management server 72 sends an error notification to the user terminal 6 of the transmission source of the volume creation request described above (S54), and thereafter ends this host volume creation processing. Consequently, a warning to the effect that the host volume HVOL cannot be created in the data center 71 designated by the user is displayed on the user terminal 6.

Meanwhile, when the management server 72 obtains a positive result in the determination of step S50, the management server 72 executes the processing of step S51 to step S57 in the same manner as step S10 to step S16 of the host volume creation processing of the first embodiment described above with reference to FIG. 16. The host volume HVOL of the host volume ID and volume size designated by the user is thereby created in one of the storage servers 7 in the data center 71 designated by the user. The management server 72 thereafter ends this host volume creation processing.

According to the storage system 73 of this embodiment having the foregoing configuration, the same effect as the storage system 10 of the first embodiment can be obtained even when performing the I/O processing of user data in two data centers 2.

(3) Other Embodiments

Note that, while the foregoing embodiment explained a case wherein the user interface presentation device presenting the host volume creation screen 60 described above with reference to FIG. 15, which is a user interface for designating the availability zone of creating the host volume HVOL to be associated with the storage controller 30 of the currently used system, is the user terminal 6, the present invention is not limited thereto, and the host volume creation screen 60 may be displayed on the management servers 4, 72, and the administrator may display the host volume creation screen 60 according to a request from the user.

Moreover, while the foregoing embodiment explained a case of applying the storage controller 30 in the data center 2 as the capacity monitoring unit for monitoring the used capacity of the respective storage servers 7, 74 in that data center 2 for each data center 2, the present invention is not limited thereto, and a capacity monitoring device having the function as the capacity monitoring unit may be substituted with the monitoring servers 4, 72, or the capacity monitoring device may be provided in each data center 2 separately from the storage server 7. Moreover, rather than the storage controller 30 and the capacity monitoring device monitoring the used capacity of the respective storage servers 7, 74 in the data center 2, they may also monitor the remaining capacity of the respective storage servers 7, 74.

INDUSTRIAL APPLICABILITY

The present invention relates to an information processing system, and may be broadly applied to a distributed storage system configured from a plurality of storage servers each installed in different availability zones.

REFERENCE SIGNS LIST

1, 70 . . . cloud system, 2, 2A to C, 71, 71A to 71C . . . data center, 4, 72 . . . management server, 6 . . . user terminal, 7, 74, 75 . . . storage server, 8 . . . network drive, 9 . . . host server, 10, 73 . . . storage system, 30, 76 . . . storage controller, 31, 77 . . . data plane, 32, 78 . . . control plane, 33 . . . application, 36 . . . redundancy group, 37 . . . physical chunk, 38 . . . chunk group, 50 . . . host volume group, 51 . . . path, 60 . . . host volume creation screen, HVOL . . . host volume.

The invention claimed is:

1. An information processing system, comprising:

a plurality of data centers connected to a network, each data center including a storage server including a plurality of storage controllers, and a storage device which is installed in each of the data centers, and provides a logical volume to a host application and processes data to be read from and written into the storage device via the logical volume; and a management server, which manages the storage server, wherein a plurality of redundancy groups of storage controllers are configured and each redundancy group includes a plurality of storage controllers which are in different storage servers in different data centers, each redundancy group including an active state storage controller which processes data, and a standby state storage controller which takes over processing of the data if a failure occurs in the active state storage controller, wherein the active state storage controller executes processing of:

storing data from a first host application in a first storage device, the first host application and the first storage device being installed in a same first data center, storing, in the first storage device, redundant data for restoring data in another storage device installed in another data center in which a standby state storage controller of a same redundancy group is installed, wherein the storage controller migrates the logical volume to another storage controller of a same data center based on a predetermined condition, wherein if the failure occurs in the first data center where the active state storage controller is installed, a standby state storage controller belonging to the same redundancy group as the active state storage controller of the first data center where the failure occurred and installed in the another data center changes to an active state and takes over processing of data, and restores data stored in a storage device of the first data center to a storage device of the another data center having the standby state storage controller that took over processing of the active state storage controller by using redundant data stored in a storage device of the another data center, and wherein the management server activates a same application as the first host application in the data center having the storage controller that takes over processing of the active state storage controller.

2. The information processing system according to claim 1, wherein among paths from the first host application to each of a plurality of logical volumes, including the logical volume, the path associated with the active state storage controller is set as an optimized path for the first host application to read and write data, and wherein if a failure occurs in the first data center and processing of the active state storage controller is taken over by another storage controller in the same redundancy group, a path from the first host application to the storage controller that took over the processing is set as a path for an activated host application that was activated for taking over the first host application to read and write data.

3. The information processing system according to claim 2, further comprising:

a user terminal coupled to the network, the user terminal configured to display a user interface for designating a data center, among the data centers, of creating the logical volume to be associated with the active state storage controller.

4. The information processing system according to claim 1, further comprising:

a capacity monitoring unit which manages a used capacity or a remaining capacity of each of the storage servers in a relevant data center for each of the data centers, wherein, when the used capacity or the remaining capacity of any of the storage servers corresponds to a predetermined condition, the capacity monitoring unit expands a capacity of each of the storage servers mounted with each of the storage controllers configuring the redundancy group to which belongs the storage controller mounted in the relevant storage server.

5. The information processing system according to claim 4, wherein, if it is determined not possible to expand a capacity of each of the storage servers mounted with each of the storage controllers configuring the redundancy group to which belongs the storage controller mounted in the relevant storage server, the capacity monitoring unit migrates a logical volume provided by a storage controller of the storage server to another storage server installed in a same data center.

6. The information processing system according to claim 1, wherein redundant data stored in a storage device installed in the another data center is mirror data, or a parity generated based on a plurality of data each stored in different data centers, wherein the active state storage controller transfers data to be stored in a storage device of a same data center in which the active state storage controller is installed to another data center which stores redundant data for generating the mirror data or the parity, and by storing data of the logical volume in a storage device of a same data center as the logical volume, read processing of data can be performed without having to perform data transfer with data centers other than the same data center and the another data center.

7. An information processing method to be executed in an information processing system including: a plurality of data centers connected to a network, each data center including a storage server including a plurality of storage controllers, a storage device which stores data, and provides a logical volume to a host application and processes data to be read from and written into the storage device via the logical volume, and a management server which manages the storage server, wherein a plurality of redundancy groups of storage controllers is configured, each redundancy group includes a plurality of storage controllers which are in different storage servers in different data centers, each redundancy group including an active state storage controller which processes data, and a standby state storage controller which takes over processing of data if a failure occurs in the active state storage controller, wherein for a combination of two or more data centers, each redundancy group has storage controllers in a different combination of storage servers, the method comprising:

a first step executed by the active state storage controller of storing data from a first host application in a first storage device, the first host application and the first storage device being installed in a same first data center, and storing, by the active state storage controller, in the first storage device, redundant data for restoring data in another storage device installed in another data center in which a standby state storage controller of a same redundancy group is installed;

a second step executed by the storage controller including: migrating the logical volume to another storage controller of a same data center based on a predetermined condition, and if the failure occurs in the first data center where the active state storage controller is installed, a standby state storage controller belonging to the same redundancy group as the active state storage controller of the first data center where the failure occurred and installed in another data center changes to an active state and takes over processing of data, and restores data stored in a storage device of the first data center to a storage device of the another data center having the standby state storage controller that took over processing of the active state storage controller by using redundant data stored in a storage device of the another data center; and activating, by the management server, a same application as the first host application in the data center having the storage controller that takes over processing of the active state storage controller.

* * * * *